United States Patent
Pearl et al.

(10) Patent No.: US 12,154,123 B2
(45) Date of Patent: Nov. 26, 2024

(54) SYSTEM AND METHOD OF COMPOSTING

(71) Applicant: ThirdBin Inc., Edgartown, MA (US)

(72) Inventors: Yuval Pearl, New York, NY (US); Yael Pearl, Edgartown, MA (US); Zeev Pearl, Edgartown, MA (US)

(73) Assignee: THIRDBIN, INC., Edgartown, MA (US)

( * ) Notice: Subject to any disclaimer, the term of this patent is extended or adjusted under 35 U.S.C. 154(b) by 0 days.

(21) Appl. No.: 17/910,504

(22) PCT Filed: Mar. 11, 2021

(86) PCT No.: PCT/US2021/021959
§ 371 (c)(1),
(2) Date: Sep. 9, 2022

(87) PCT Pub. No.: WO2021/183797
PCT Pub. Date: Sep. 16, 2021

(65) Prior Publication Data
US 2023/0206266 A1 Jun. 29, 2023

Related U.S. Application Data

(60) Provisional application No. 62/988,576, filed on Mar. 12, 2020, provisional application No. 63/040,713, filed on Jun. 18, 2020.

(51) Int. Cl.
*G06Q 30/0207* (2023.01)
*G06Q 10/30* (2023.01)
(Continued)

(52) U.S. Cl.
CPC ......... *G06Q 30/0207* (2013.01); *G06Q 10/30* (2013.01); *G16Y 20/20* (2020.01); *G16Y 40/10* (2020.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 2009/0139139 A1* | 6/2009 | Tilman | ................... | G06Q 10/04 47/58.1 R |
| 2010/0138671 A1* | 6/2010 | Kim | ..................... | G06F 21/1063 713/189 |

(Continued)

FOREIGN PATENT DOCUMENTS

| WO | WO-2020/012473 | 7/2019 |
|---|---|---|
| WO | WO-2019/140464 | 1/2020 |

OTHER PUBLICATIONS

Kollah, B., Dubey, G., Saha, J.K., & Mohanty, S.R. (2014). Composting: An opportunity in a carbon conscious world for combating climate change. Scientific Research and Essays, vol. 9 Issue 13 (hereinafter "Kollah").*

(Continued)

*Primary Examiner* — Allan J Woodworth, II
(74) *Attorney, Agent, or Firm* — PEARL COHEN ZEDEK LATZER BARATZ LLP

(57) ABSTRACT

A system and method for monitoring a network of IoT composting end-devices comprising one or more IoT compost bins, IoT composters, remote monitoring devices, and personal user devices. Each IoT composting end-device may have an embedded wireless communication module and sensors to measure an amount of compostable material contained therein. Measurements may be aggregated for user groups, households, communities, etc. and converted into metrics of aggregated amounts, sustainability, compost quality, composting cycle stage, status, composting conditions, and other parameters, which may be posted on a public forum to track and encourage community composting.

22 Claims, 9 Drawing Sheets

(51) Int. Cl.
  *G16Y 20/20* (2020.01)
  *G16Y 40/10* (2020.01)

(56) References Cited

U.S. PATENT DOCUMENTS

| | | | | |
|---|---|---|---|---|
| 2010/0184131 | A1* | 7/2010 | Nicoletti | C05F 17/60 435/286.1 |
| 2012/0090365 | A1* | 4/2012 | Ersek | C05F 11/08 71/7 |
| 2015/0100401 | A1* | 4/2015 | Devine | G06Q 30/0217 705/14.19 |
| 2015/0368605 | A1* | 12/2015 | Nelson | C12Q 3/00 435/286.1 |
| 2019/0005507 | A1* | 1/2019 | Rodoni | B09B 1/00 |
| 2019/0218153 | A1* | 7/2019 | Price | C05F 17/05 |
| 2019/0238319 | A1* | 8/2019 | Beck | H04L 9/3239 |
| 2019/0339112 | A1* | 11/2019 | Balachandran | G01G 17/00 |
| 2019/0372762 | A1* | 12/2019 | Shainski | G06F 16/1824 |
| 2020/0082354 | A1* | 3/2020 | Kurani | G01K 1/026 |
| 2020/0353474 | A1* | 11/2020 | Crepeau | C05F 9/02 |
| 2022/0012366 | A1* | 1/2022 | Burceanu | H04L 9/008 |
| 2022/0131845 | A1* | 4/2022 | Gaddam | H04L 63/08 |

OTHER PUBLICATIONS

Kollah, B., Dubey, G., Saha, J.K., & Mohanty, S.R. (2014). Composting: An opportunity in a carbon conscious world for combating climate change. Scientific Research and Essays, vol. 9 Issue 13 (hereinafter "Kollah") (Year: 2014).*

* cited by examiner

SYSTEM AND METHOD OF COMPOSTING

CROSS-REFERENCE TO RELATED APPLICATIONS

This application is a National Phase Application of PCT International Application No. PCT/US2021/021959, International Filing Date Mar. 11, 2021, claiming the benefit from U.S. Provisional Patent Application No. 62/988,576, filed Mar. 12, 2020 and U.S. Provisional Patent Application No. 63/040,713, filed Jun. 18, 2020, all of which being incorporated herein by reference in their entirety.

FIELD OF THE INVENTION

Embodiments of the invention are directed to the field of composting systems and methods including compost bins and composters.

BACKGROUND OF THE INVENTION

Composting reduces waste, greenhouse gasses such as methane emanated from landfills and contributes significantly to sustainability. However, while recycling is widespread, as numerous households have a trash bin and a recycling bin in their kitchens, composting lags behind. Most households simply do not compost. Accordingly, there is currently no infrastructure to encourage composting in the home.

There is therefore a longstanding need in the art to monitor users composting and encourage the practice to collectively improve the environment.

Compost, Composting, Composted and any other derivative of compost may be used herein to describes any stage of or the entire life cycle of collecting organic material and transforming it into usable form of compost. It can describe, for example, the collection of compostable material in a household and/or outdoor environment and/or the process of transferring the collected material into usable compost.

SUMMARY OF THE INVENTION

Domestic composting systems in rural and suburban environments typically include one or more indoor compost bins for collecting food scraps and one or more outdoor composters into which the food scraps are emptied and composted. Embodiments of the invention turn one or both types of bins into smart composters which measure the quantity and/or quality of the resulting compost which varies greatly depending on chemical and environmental conditions, such as, temperature, agitation, and the balance of different types of compostable material (e.g., green, protein, or brown waste).

In shared-compost environments, such as urban environments, the outdoor composter is collectively used by multiple users or households. Embodiments of the invention provide the ability to monitor the quantity, timing and quality of the amount of composting material and/or various types of material that are contributed by multiple composting end-users.

In some embodiments of the invention, the aforementioned longstanding problem inherent in the art is overcome by remote device(s) monitoring local "smart" composting end-devices connected by an IoT network. The smart composting end-devices may include IoT compost bin(s) (typically deployed indoors) for collecting compostable material and/or IoT composter(s) (typically deployed outdoors) for composting the collected compostable material. The IoT composting end-devices may include sensors to autonomously measure properties of the compostable material (e.g., amount, type, agitation patterns, temperature, etc.) and communicating those properties to the monitoring device(s). Compost properties may be communicated periodically, upon remote request (e.g., from the monitoring device(s)), and/or triggered by an event or threshold parameter (e.g., each material deposit, or upon filling or emptying the device) or initiated by the end user. Users may verify the autonomously collected data, or may manually enter data via user interface devices, e.g., embedded on the IoT composting end-devices and/or on applications in their user devices, such as computers or smartphones.

The monitoring device(s) may analyze all sensor data, gathered from one or more compost bins, composters, and/or user devices, which may be aggregated over one or multiple composting lifecycles, to compute information regarding measured amounts of compostable material and/or environmental impact of composting those measured amounts. The monitoring device(s) may send recommended types of material deposits (e.g., green, protein, and/or brown waste) that are deficient in a composter to optimize the type balance and quality of the resulting compost. The monitoring device(s) may send recommended agitation schedules or alerts, or remotely trigger agitation or emptying, predicted to optimize the compost quality. The monitoring device(s) may generate maps or alerts indicating IoT composters with deficient amounts of each type of compostable material to encourage more balanced types of deposits. The monitoring device(s) may publish any combination of this information over a public, private, or hybrid public-private forum, broadcast to one or more user accounts via their user devices, such as smartphones.

The monitoring device(s), IoT compost bin(s), IoT composter(s), and/or user device(s), may operate in tandem or independently in the intelligent IoT composting system, for example, as follows.

An embodiment of central monitoring device(s) may comprise one or more communication circuit(s) configured to communicate with the network of IoT composting end-devices via wireless modules embedded therein. The central monitoring device(s) may receive, from each of the IoT composting end-devices, a measure of an amount of compostable material detected by one or more sensors in the IoT composting end-device and an associated unique identifier of the IoT composting end-device. The central monitoring device(s) may aggregate a plurality of measures of the amount of compostable material detected over one or more composting lifecycles associated with one or more of the IoT composting end-devices. The central monitoring device (s) may post on a public forum the amount of compostable material detected over the one or more composting lifecycles associated with one or more of the IoT composting end-devices. In some embodiments, the central monitoring device(s) may convert the aggregate measure of the amount of compostable material to a metric of sustainability predicted or measured to be caused by composting the aggregate amount of compostable material, and post the metric of sustainability associated with the one or more IoT composting end-devices on the public forum.

In an embodiment of the invention, a method and system comprising one or more remote devices is provided for monitoring a network of IoT composting end-devices. One or more communication circuits may communicate with the network of IoT composting end-devices via wireless modules embedded therein. One or more processors may receive, from each of the IoT composting end-devices, a measure of an amount of compostable material detected by one or more sensors in the IoT composting end-device and an associated unique identifier of the IoT composting end-device. The one or more processors may aggregate a plurality of measures of the amount of compostable material detected over one or more composting lifecycles associated with one or more of the IoT composting end-devices to quantify an aggregate amount of compostable material.

In an embodiment of the invention, a method and an IoT composting end-device is provided for monitoring composting. The IoT composting end-device may be an IoT compost bin or an IoT composter. The IoT composting end-device comprises a wireless communication module comprising a complete wireless communication circuit including an antenna for communicating over a wireless communication network. The IoT composting end-device comprises one or more sensors configured to detect data representing an amount of compostable material contained in a container that is integral or attached to the IoT composting end-device. The IoT composting end-device comprises one or more memories to store a unique identifier of the IoT composting end-device. The IoT composting end-device comprises one or more processors configured to compute a measure of the amount of compostable material based on the data detected by the one or more sensors, and to transmit, via the wireless communication module, the measure of the amount of compostable material and the unique identifier of the IoT composting end-device to one or more devices over the wireless communication network.

In an embodiment of the invention, a method and a host is provided for trading carbon credits to reduce or eliminate carbon emissions. One or more host devices may include one or more communication circuits configured to communicate with a plurality of IoT composting end-devices and/or personal user devices, via wireless modules embedded therein. The plurality of IoT composting end-devices and/or personal user devices may each be registered to one of a plurality of composting users. The One or more host devices may also include one or more processors to perform operations. The one or more host devices may receive, via the one or more communication circuits, from each of the IoT composting end-devices and/or personal user devices, a measure of an amount of compostable material and a unique identifier of the composting user registered to the IoT composting end-device or personal user device. The one or more host devices may aggregate a plurality of the measures of amounts of compostable material composted over one or more composting lifecycles associated with the unique identifier to quantify an aggregate amount of material composted by each composting user. The one or more host devices may compute a measure of net negative carbon emissions reducing greenhouse gasses in the Earth's atmosphere due to composting the aggregate amount of material composted by one or more of the composting users. The one or more host devices may host an exchange to trade carbon credits representing portions of the measure of net negative carbon emissions to reduce or eliminate a measure of net positive carbon emissions in the Earth's atmosphere produced by one or more carbon-positive users. The one or more host devices may securely issue a digital medium containing the traded carbon credits to the one or more carbon-positive users.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
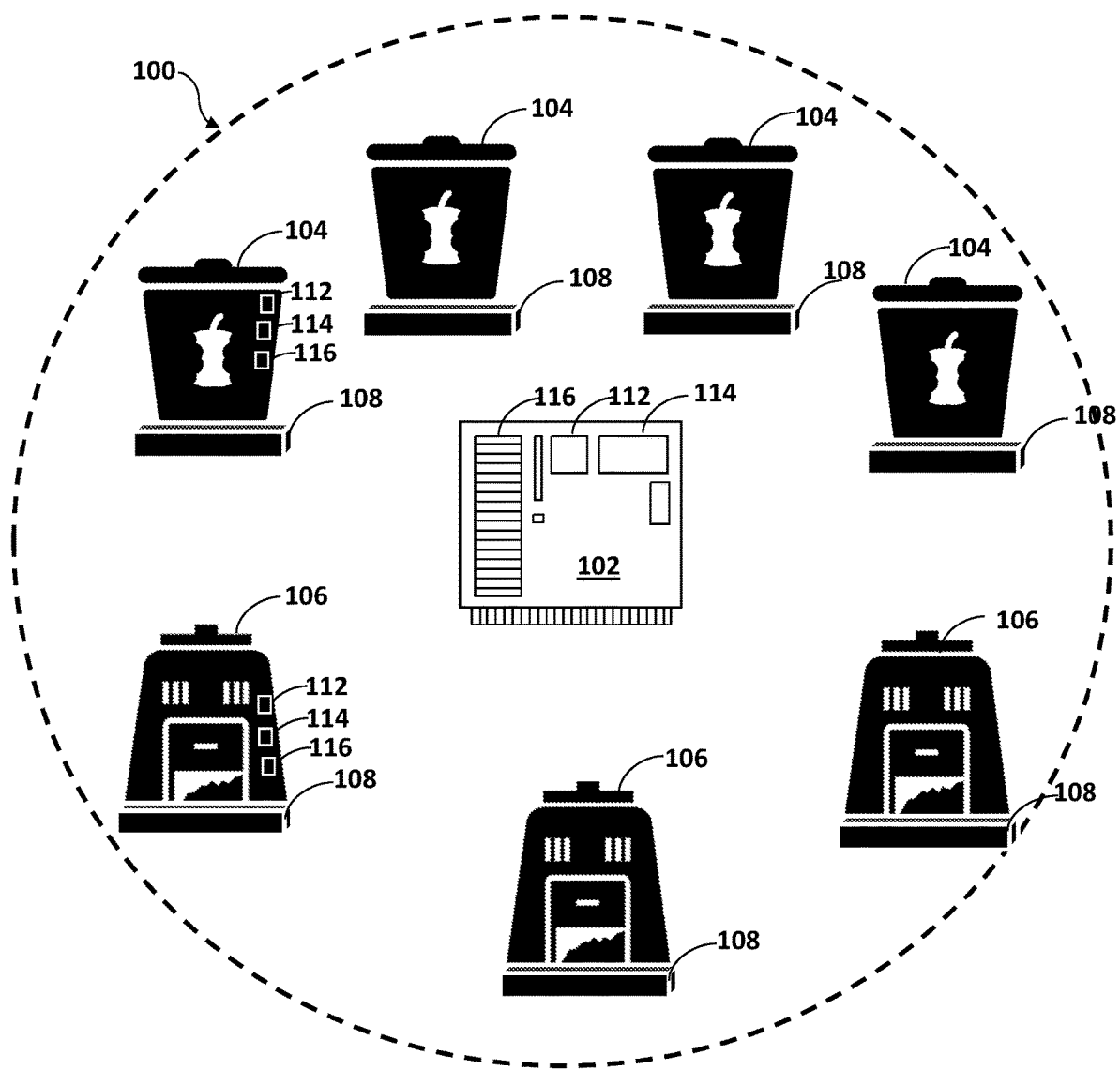
FIG. 1 schematically illustrates a system for monitoring an IoT network of composting end-devices, in accordance with some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

Embodiments of the invention provide devices, systems, and methods for centralized monitoring of an IoT network of smart compost bins and/or composters that autonomously, or prompted by a user, measure and log amounts of compostable material contained therein. The centralized monitoring device(s) may post, e.g., on a public forum, metrics of the quantity of the compostable material and/or corresponding environmental impact thereof (such as, a metric of sustainability or carbon footprint). Public forums may encourage composting by setting and tracking personal, group or community goals, incentivizing composting, and/or creating competitive environments to maximize composting efforts.

Reference is made to FIG. 1, which schematically illustrates a system for monitoring an IoT network 100 of composting end-devices, in accordance with some embodiments of the invention.

Internet of Things (IoT) network 100 is an inter-connected network of IoT compost bins 104 (for collecting compostable material, such as, food scraps and plant matter) and IoT composters 106 (for composting the collected compostable material e.g., emptied from the compost bins). IoT composting devices 104 and 106 are "smart" devices with electronics, software, sensors, and network connectivity. As used herein, the term IoT composting devices and smart devices may refer to both devices that are connected directly to a wide area network, such as the Internet, and to devices that are connected locally, wirelessly, by wire or coupling, to other devices, such as a smartphone, that are connected to a wide area network. Each IoT composting device 104 and 106 may include an embedded wireless module 116 comprising one or more complete wireless communication circuit(s) and one or more antennae to connect and communicate wirelessly over IoT network 100, such as, the Internet. IoT composting devices 104 and 106 may measure or gather data about the compostable material contained therein. To identify the source of the data, the gathered data may be associated with a unique identifier, e.g., of the associated IoT composting end-device 104 and 106, a user or an account. The unique identifier may be, for example, an account number (e.g., a personal, group, household, or community account registered with monitoring device 102) or a device identifier (e.g., an International Mobile Equipment Identity (IMEI) or Integrated Circuit Card Identifier (ICCID), transmitted in a data packet body, or a sender IP address or telephone number (MSISDN) transmitted in a data packet header). The gathered data and unique identifier may then be transmitted wirelessly over IoT network 100 and relayed to a monitoring device 102. In some embodiments, each network device 104 and 106 has a predesignated transmission time or order, and its identity may be deduced from the scheduled time or order, such that, no identifier needs to be transmitted.

Each IoT compost device 104 and/or 106 may measure and log compost metrics including amount(s) of compostable material. Amounts of compostable material may be autonomously measured as a metric of weight, mass, density or pressure by a scale or gauge 108, as a spatial metric of volume (3D), cross-sectional area (2D), or height of the load (1D) by imager(s), distance sensor(s) (e.g., ultrasonic, infrared (IR), or Light Detection and Ranging (LiDAR) sensors), or position sensor(s) (e.g., touch sensors such as capacitive sensors), or as any other metric of material amount. Scale 108 and/or other sensors may be attached to or embedded in, and electrically and operably connected to, IoT compost device 104 and/or 106. Scale 108 and/or other sensors may be tared (zero-ed) for each measurement to measure only the added material. Amounts of compostable material may be measured periodically or triggered by an event, such as, a partial fill per material deposit into IoT compost device, completely filling IoT composting device, completely emptying IoT compost device, and/or a combination of those events (e.g., a material transfer between devices, which is a combination of the complete emptying of a full compost bin 104, immediately followed by, or concurrently with, a partial filling of the composter 106 by the same amount of material). Events may be detected autonomously by one or more sensor and/or by manual entry through a user interface. For example, partially filling per material deposit into IoT compost device may be triggered by a sensor detecting a smart lid 124 opening, or a weight or volume change within a predefined threshold, completely filling IoT composting device may be triggered by scale 108 detecting a maximum weight or volume, and completely emptying IoT compost device may be triggered by scale 108 detecting a decrease to approximately zero weight or volume of compostable material, or an orientation sensor, such as, a gyroscope, detecting device emptying by inversion. Manual detection of events may be entered by a user through a user interface, such as, a device-embedded user interface 126 or via an application on a connected smartphone or other personal user device 110. Because metrics of amount, such as weight and volume, may vary at different stages of decomposition in the compost cycle (e.g., caused by differing chemical composition and water weight), for consistent measurements, amount metrics may be measured at consistent times in the compost cycle for all the material (e.g., upon material deposit, upon emptying of the household compostable material from an indoor IoT compost bin 104 into an outdoor IoT composter 106, upon decomposition to a particular stage, or upon maturation of compost).

Each IoT compost device 104 and/or 106 may additionally measure and log one or more type(s) associated with each amount of compostable material, such as, e.g., green, protein, and/or brown waste. Types of compostable material may be measured periodically or triggered by an event in IoT composting device 104 and/or 106, such as, a partial fill per material deposit, a complete fill, or emptying of IoT composting device 104 and/or 106. Each measurement may indicate the primary type, or may include a breakdown of all types therein (e.g., independent percentages or proportions of each type). Types of compostable material may be autonomously measured by a sensor, such as, an imager (e.g., based on color and/or texture), environmental sensor (e.g., for pH, enzymes, etc.), and/or scale 108 (e.g., based on material density), or may be manually entered. One or more imager(s) may be attached in an interior surface of a compost container of IoT compost device 104 and/or 106, such as, a bottom surface of a lid of IoT compost bin 104, to provide visibility of the interior of the container. Manually selected types may be entered through a user interface (e.g., device-embedded user interface 126 or via an application on a connected a smartphone or other personal user device 110). Manually selected types may be associated with the amount measured by the IoT composting end-device at substantially the same time or during the same session. Each IoT compost device 104 and/or 106 may additionally or alternatively measure and log other compost properties including compost agitation (e.g., number of agitation cycles, rate, frequency, periodicity, duration, etc.), compost material properties (e.g., temperature, pH, enzymes, etc.), environmental conditions (e.g., weather, humidity, location, etc.), location (e.g., GPS coordinates or user-registered region or address), and/or any other metric relevant to computing compost quality.

Figure 4:
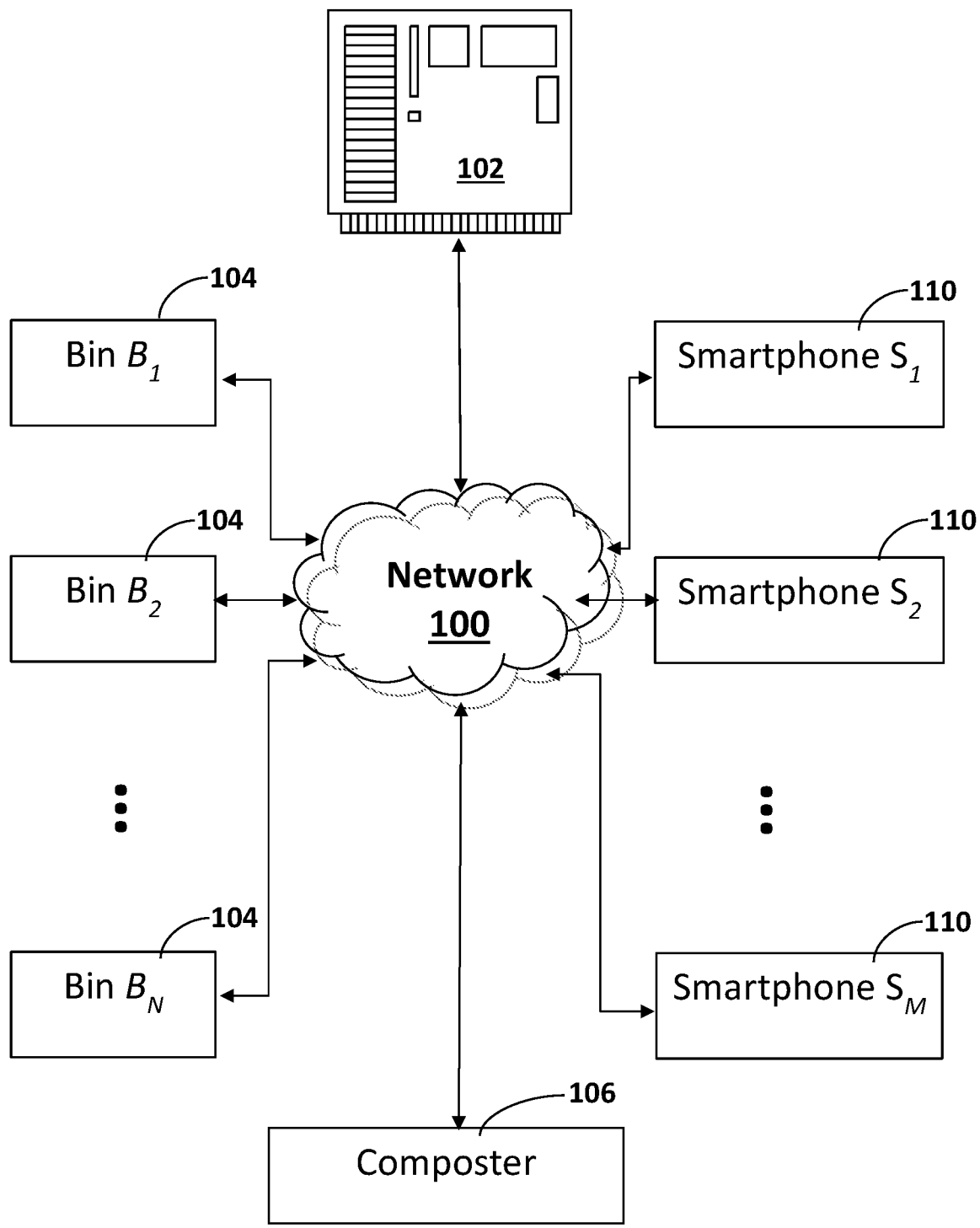
FIG. 4 schematically illustrates a multi-user system for monitoring an IoT network of composting end-devices, e.g., suited for a shared group or household of users, in accordance with some embodiments of the invention.
Figure 5:
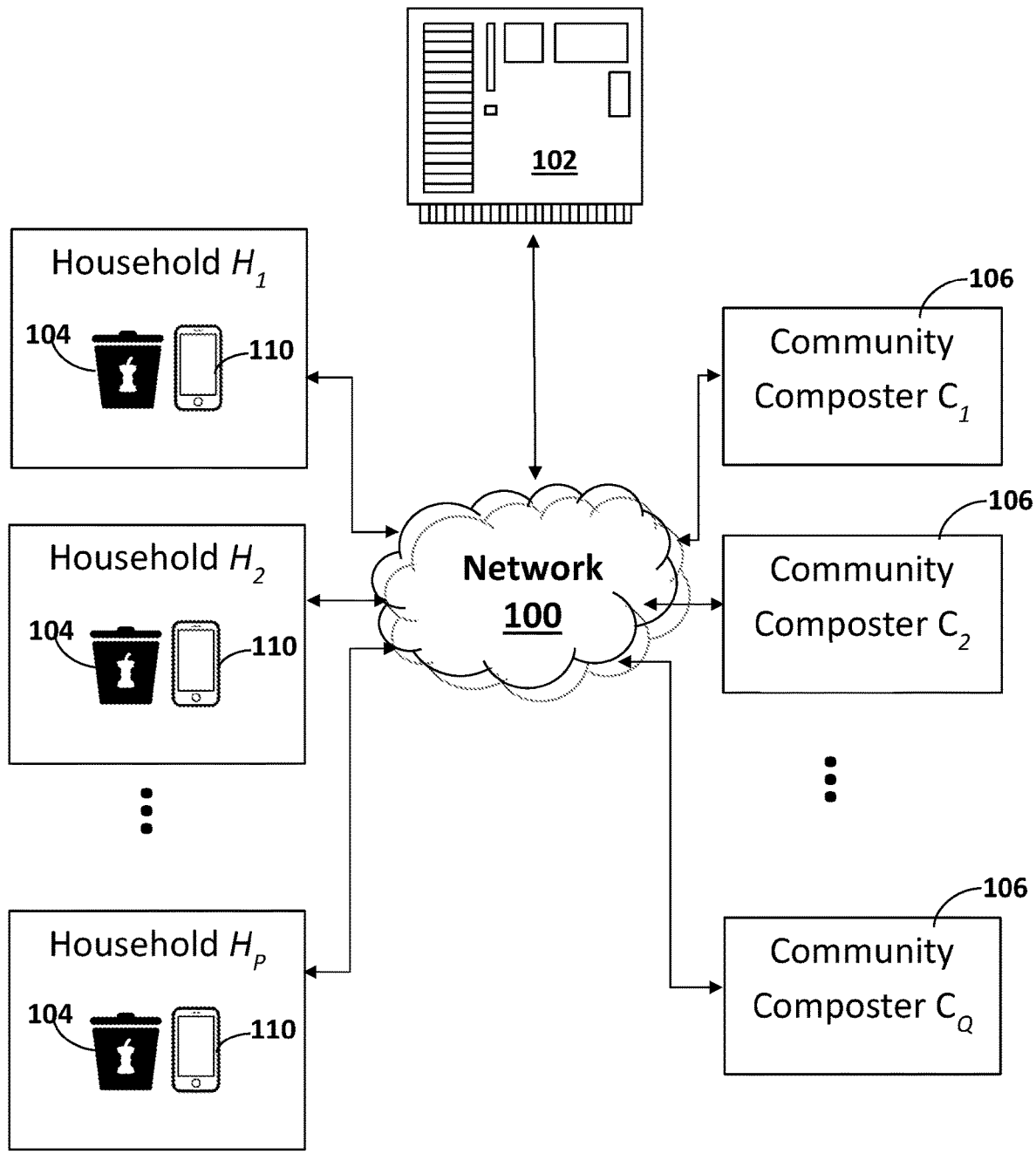
FIG. 5 schematically illustrates a multi-account system for monitoring an IoT network of composting end-devices, e.g., suited for a shared community of multiple groups or households of users, in accordance with some embodiments of the invention.

Monitoring device 102 may receive and analyze the measured data transmitted from IoT compost devices 104 and/or 106. Monitoring device 102 may aggregate one or more metrics of amount(s), type(s), and other condition(s) of the compostable material detected over one or more composting lifecycles associated with IoT composting devices 104 and/or 106. Compost material metrics may be aggregated over time (e.g., periodically, such as, daily, weekly, annually), over cycles (e.g., all cycles, every predetermined number of N cycles), upon a triggering event or threshold crossing (e.g., community compost pickup or removal), etc. Compost material metrics may be aggregated that are associated with a single IoT compost bin 104, a single IoT composter 106, a plurality of IoT compost bins 104 associated with a single or a plurality of IoT composters 106, a plurality of IoT composters 106 associated with a single or a plurality of IoT compost bins 104, or a single person/entity/account or multiple persons/entities/accounts (e.g., in a group, household or community) associated with one or more IoT compost bins 104 and/or IoT composters 106. In one example, FIG. 4 shows a "group" or "household" account comprising a group of multiple IoT composting bins 104 and multiple personal user communication devices 110 associated with a single shared composter 106. In another example, FIG. 5 shows a shared "community" account comprising multiple community composters 106 and multiple groups of IoT composting bin(s) 104 and/or multiple personal user communication device(s) 110 (e.g., for different respective groups or households of users). Metrics may be associated with any combination of single or multiple devices 102, 104, 106, 108 and 110, users, or accounts.

Monitoring device 102 may post on a public forum the aggregated amount of compostable material detected over the one or more composting lifecycles associated with one or more of the IoT composting end-devices 104 and/or 106. Monitoring device 102 may compute and post additional metrics on the public forum deduced from the aggregated amount of compostable material, such as, $CO_2$ Equivalent ($CO_2$ E), a metric of sustainability, a metric of quality, a stage of the composing lifecycle, a percentage or other factor of improvement in amount, sustainability or quality, from a previous period or historic average, etc. The metric of sustainability may quantify a sustainability effect predicted or measured to be caused by composting the aggregate amount of compostable material. The metric of sustainability may include any individual or combined, predicted or measured, metrics of, for example, $CO_2$ Equivalent ($CO_2$ E), Carbon dioxide (CO2) reduction, Methane (CH4) reduction, Nitrous oxide (N2O) reduction, Hydrofluorocarbons (HFCs) reduction, Perfluorocarbons (PFCs) reduction, Sulphur hexafluoride (SF6) reduction, global warming potential (GWP), and/or carbon footprint. In some embodiments, the metric of sustainability predicted at a current time is based on an experimentally observed metric of sustainability measured for composting material of the same or similar amount and/or type(s) in the past.

The metric of quality may be based on proportions of the aggregate amount associated with each of a plurality of different types of the compostable material. Types of compostable may be segmented into broad categories (e.g., green waste, protein waste, and brown waste) or specific items (e.g., coffee, hay, paper, eggshells, etc.) e.g., each associated with a carbon to nitrogen (C:N) ratio. Proportions may have greater metrics of quality the closer they are to optimal type ratios (e.g., 3:1 parts brown to green, or 30:1 carbon to nitrogen ratio). In some embodiments, the type of compostable material is independently determined for the amount of material in each deposit into (e.g., partially filling) the IoT composting end-device 104 and/or 106. Additionally or alternatively, the type of compostable material is determined once for the entire IoT composting end-device 104 and/or 106, e.g., each time the device is completely filled.

The stage of the composing lifecycle may be computed based on sensed conditions within each of a plurality of IoT composters 106 (e.g., temperature, material density, an amount or type of enzymes, time, and color of composting content). Monitoring device 102 may post the stage of the composing lifecycle for each of the plurality of IoT composters 106 (and/or individual containers therein) based on the measure of composting conditions. In one embodiments, the stage(s) of the composing lifecycle may be mesophilic, thermophilic, and maturation phases. Additionally or alternatively, the stage(s) or status of the composing lifecycle may be compost "pending" for content contained in the IoT compost bin 104, compost "in-progress" for content contained in the IoT composter 106 at a composing lifecycle stage prior to maturation, and compost "complete" for content contained in or emptied from the IoT composter 106 at or after a composing lifecycle stage of maturation.

In some embodiments of the invention, third parties may offset their net positive carbon emissions by acquiring "carbon credits" that quantify net negative carbon emissions reduced in the Earth's atmosphere due to composting, e.g., to create a total carbon-reduced or carbon-neutral supply chain. While landfill decomposition (e.g., under anaerobic conditions by microbes in the absence of oxygen) releases methane into the atmosphere, composting (e.g., under aerobic conditions with oxygen) does not produce (or produces less) methane because methane-producing microbes are not typically active in the presence of oxygen. Composting thus reduces net methane and other green house gasses output by the decomposting material. For example, each kilogram (kg) of compost saves approximately 15 kg of carbon dioxide equivalents ($CO_2$ E). This is because 10 kg of household organic waste is equivalent to 1 kg (10%) of organic material (the rest being water). In a landfill, that 1 kg of organic material is converted to 1 kg of methane (CH4). Methane (CH4) is approximately 30 times stronger (more harmful) than $CO_2$, and so, that 1 kg of methane is equivalent to approximately 30 kg $CO_2$ E. In contrast, in a composter, 1 kg of organic material is converted to approximately 2 kg of $CO_2$ E. Thus, composting organic material produces 15 times less $CO_2$ E than disposing of it in a landfill.

Embodiments of the invention quantify and trade the real-world reduction of these physical greenhouse gas emissions in the Earth's atmosphere based on the measure of the amount of material composted. Composters (e.g., individual users, groups, communities, etc.) may trade their compost production for rewards or carbon credits issued in digital media by a host (e.g., governments, companies, etc.), e.g., over a public forum hosted by monitoring device 102. The host may incentivize composters by issuing them rewards proportional to the amount of their traded compost. The host may then trade or sell carbon credits quantifying that compost to third parties. Carbon credits and rewards may be measured based on, e.g., proportional to, amounts of compost, amounts of carbon dioxide or other green house gas equivalents, such as tons of $CO_2$ equivalents (t$CO_2$e), and/or metrics of sustainability. The value of carbon credits may fluctuate with market forces, which may be traded in a carbon stock market. A review of global markets shows that, in 2020, each ton of $CO_2$ E has value in a range between 10 and 20 US dollars.

Third parties that are "climate-negative" or "carbon-positive," releasing a net positive amount, +x1, of carbon or greenhouse gas emissions into the atmosphere, may reduce or eliminate their environmental impact by acquiring carbon credits equivalent to a second net negative amount of greenhouse gasses resulting from composting, −x2. The total resulting carbon impact or greenhouse gals production is x1−x2, thereby reducing the third party's environmental impact. When $|x1|>|x2|$, the third party is carbon-reduced but still climate-negative or carbon-positive; when $|x1|=|x2|$, the third party is "carbon-neutral" (releasing net zero carbon or greenhouse gas emissions); and when $|x2|>|x1|$, the third party is "climate positive" or "carbon-negative" (not only releasing net zero amount of carbon or greenhouse gas emissions, but creating an environmental benefit by removing additional carbon or greenhouse gasses from the atmosphere) ("| |" indicating magnitude or absolute value of a variable). By coupling third party operations with net positive greenhouse gas emissions with composters with net negative greenhouse gas emissions, embodiments of the invention may create new supply chains to reduce or eliminate the overall environmental impact of the third party's greenhouse gas emissions.

Figure 8A:
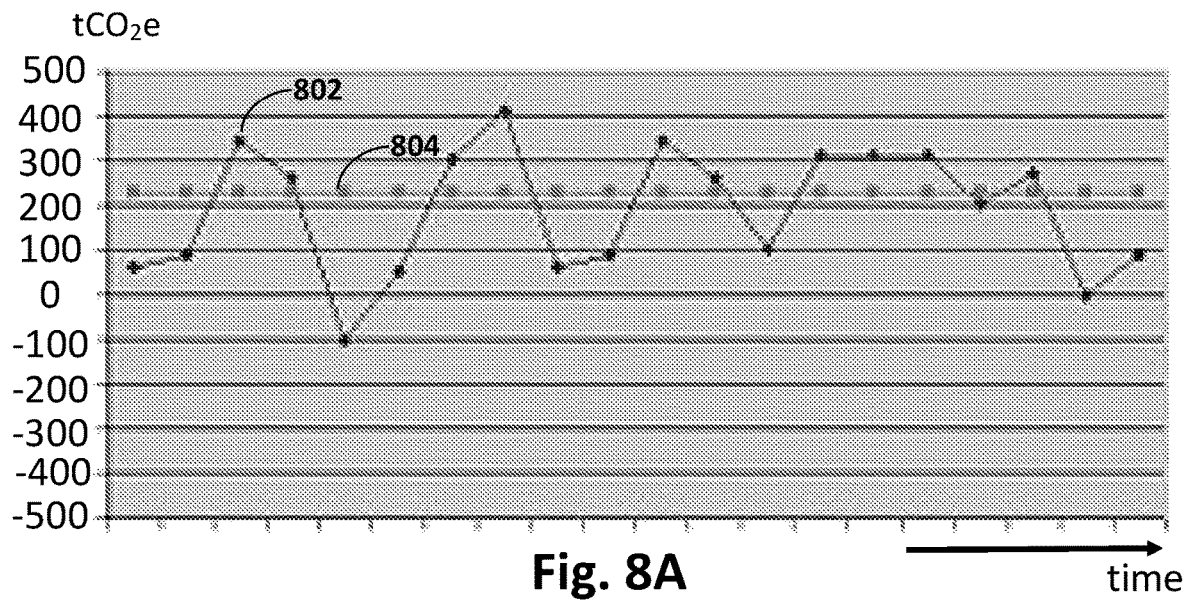
FIGS. 8A and 8B are example graphs of carbon emissions (FIG. 8A) and an equal and opposite amount of carbon credits (FIG. 8B) traded to offset the carbon emissions and achieve carbon-neutral operations, according to an embodiment of the invention.
Figure 8B:
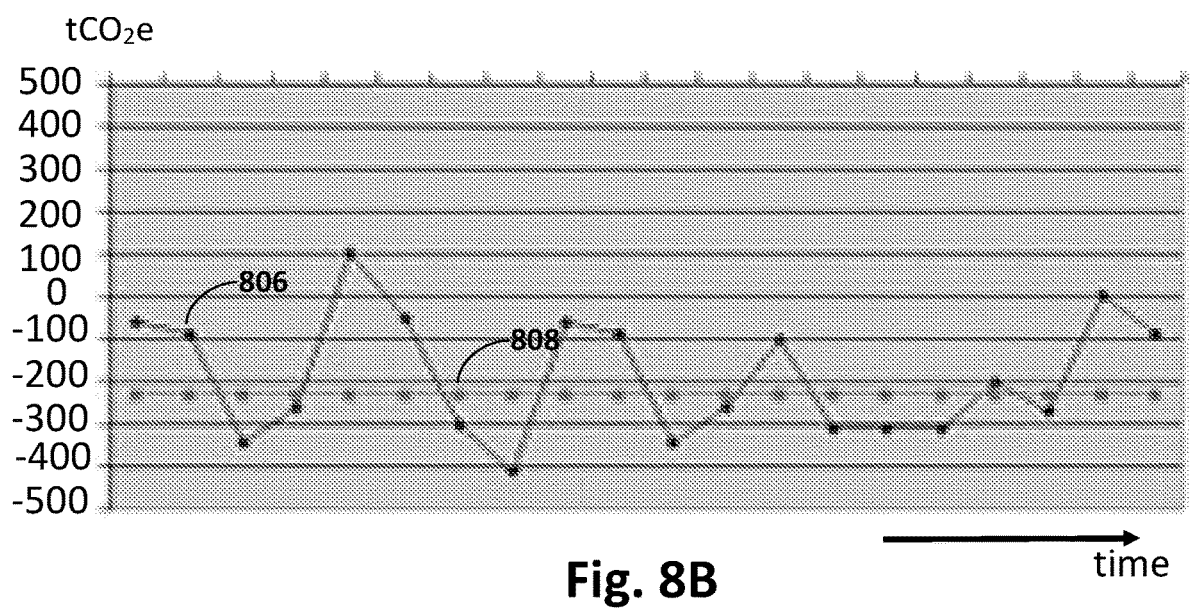

Reference is made to FIGS. 8A and 8B, which are example graphs quantifying the net positive carbon emissions (+x1) produced over time by a third party (graph 802 of FIG. 8A) and an equal and opposite amount of carbon credits (−x2) acquired from one or more composters (graph 806 of FIG. 8B), according to an embodiment of the invention. In one embodiment, carbon emissions and credits may be measured or quantified periodically as in graphs 802 and 806. Additionally or alternatively, carbon emissions may be averaged over multiple individual measurements represented by average graphs 804 and 808. In this example, the third party represented in FIG. 8A acquires carbon credits representing an amount of negative carbon dioxide equivalents (−x2) in FIG. 8B that is equal and opposite to its positive carbon production (+x1) to cancel and generate an overall carbon-neutral supply chain. In other embodiments, the supply chain may be reduced carbon-negative (e.g., $|x1|>|x2|$) or carbon-positive (e.g., $|x2|>|x1|$).

Carbon credits may be traded per unit (e.g., in $CO_2$ equivalents ($CO_2$ E)) so the carbon credits in FIG. 8B may be issued for compost generated by multiple (many) composting parties. In one embodiment, carbon credits may be acquired in uniform proportions from all participating composters. In other embodiments, carbon credits may be acquired from one or more specific composters and/or one or more composters associated with a desired user segment, such as, based on geography, communities, industry, supply-chain, or other group segmentation. In some embodiments, third parties may be coupled with composters that are in the same segment (e.g., to achieve carbon-neutral production in a particular segment), or may target a segment or community, such as impoverished or at risk communities or groups advocating a desired campaign. In one example, governments may acquire carbon credits for compost generated by its citizens or constituents to comply with standards or agreements, such as those set by the Paris convention.

Carbon credits or rewards may be issued securely by a secure centralized host, in a peer-to-peer blockchain network, using proxy re-encryption, or another security scheme that anonymizes or encrypts the user's or source's identifying digital information. In one embodiment, the secure centralized host may establish a secure communication channel with each system participant. In one blockchain embodiment, each data block may comprise information about a number of carbon credits, a unique identifier associated with a user to which the credits are issued, and/or a hash or signature encoding the current and/or another (e.g., previous) block. Because each block encodes one or more different data blocks, and multiple peers encode blocks redundantly, it is difficult to tamper with a data block without detection. In a proxy re-encryption embodiment, a string of users are issued user-specific proxy re-encryption keys. Each proxy re-encryption key simultaneously swaps another user's key with one's own key, without exposing or decrypting the underlying carbon credits and/or associated user information. Thus, the carbon credits may be passed from user to user, while remaining encrypted. These methods allow the composters and third parties to trade securely and privately.

Quantifying carbon emissions records the target amount of carbon production in the atmosphere and thus quantifies the amount of composting needed to offset its effects. Trading carbon credits allows carbon-positive third parties to offset and neutralize the impact of their carbon emissions by commissioning composting in commensurate amounts that reduces or eliminates total carbon emissions. Embodiments of the invention thereby reduce greenhouse gasses to effect an improvement in the chemical composition of the Earth's atmosphere.

In some embodiments with shared community IoT composters 106, e.g., as shown in FIG. 5, monitoring device 102 may host, over the public forum, a map of the community IoT composters 106 at various locations to route users. The map may indicate, for each IoT composters 106, an amount of compostable material contained therein or an amount of empty space therein. The map may further indicate, for each IoT composters 106, deficient amounts of each type of compost to add to achieve an optimal balance of types. Monitoring device 102 may also generate a map of optimal locations to place IoT composters 106 that best fits predicted or measured composting needs of nearby IoT compost bins 104. Maps may be generated by statistical modeling or machine learning.

Monitoring device 102 may send commands over IoT network 100 to control IoT composting devices 104 and 106 in response to the gathered data. One example remote control command is activating an alert on a user interface indicating IoT composting device 104 and/or 106 should be emptied, filled or agitated. The alert may be displayed on embedded user interface 126 on device 104 or 106 and/or on an application on a user device 110. Another example remote control command is remotely activating a motor or electronics in IoT composter 106 to remotely agitate IoT composter 106 or transfer compost between different containers of IoT composter 106 upon reaching a particular stage of the composting cycle.

In some embodiments, one or more of devices 102, 104, 106, 108 and 110 may verify a chain of custody when transferring compostable material between multiple devices. This may bolster security in the IoT network 100 and reduce double-counting of compostable material. The chain of custody of transferred compostable material may be verified by determining that a net loss in an amount of compostable material emptied (e.g., from an IoT compost bin 104) substantially matches a net gain in an amount of compostable material added (e.g., to an IoT composter 106) within a predefined margin of error and within a predefined duration of time. Additionally or alternatively, the chain of custody of transferred compostable material may be verified by authenticating signals communicated between a pair of an emptied IoT compost bin 104 and a filled IoT composter 106.

Each device 102, 104, 106, 108 and 110 may include one or more controller(s) or processor(s) 112 for performing operations disclosed herein and one or more memorie(s) 114 for storing data (e.g., in a database) and/or instructions (e.g., software) executable by processor(s) disclosed herein. Processor(s) 112 may include, for example, a central processing unit (CPU), a digital signal processor (DSP), a microprocessor, a controller, a chip, a microchip, an integrated circuit (IC), or any other suitable multi-purpose or specific processor or controller. Memorie(s) 114 may include, for example, a read only memory ("ROM"), a random access memory ("RAM"), a dynamic RAM ("DRAM"), a flash memory, a volatile memory, a non-volatile memory, a cache memory, a buffer, or other suitable permanent, long-term or short-term memory units or storage units. Each device 102, 104, 106, 108 and 110 may include one or more embedded wireless module 116 comprising one or more complete wireless communication circuit(s) and one or more antennae to connect and communicate wirelessly over IoT network 100. Additionally or alternatively, embedded module 116 may be a wired (not wireless) communication circuit, e.g., whereby wireless communication from IoT network 100 devices is transformed to wired communication prior to reaching monitoring device 102. IoT network 100 may include, and one or more wireless module(s) 116 may be adapted to communicate over, any individual or combination of public or private networks including, for example, a Personal Area Network (PAN), Local Area Network (LAN), Wireless LAN (WLAN), Metropolitan Area Network (MAN), Campus Area Network (CAN), Wide Area Network (WAN), and Mesh Network, and may operate using any individual or combination of communication protocols including cellular (e.g., GSM/GPRS/EDGE (2G), UMTS/HSPA (3G), LTE (4G), or 5G), Wi-Fi, Near Field Communication (NFC), Bluetooth (BT), Zigbee, and Z-Wave.

In some embodiments of the present invention, to avoid double counting quantities of compostable material, measurements (e.g., to provide an aggregate quantity) may be performed by using different metrics for each different individual or type of IoT device. For example, a first metric may be used for household indoor smart IoT compost bin 104, a second metric may be used for outdoor smart IoT composter 106, and/or a third metric may be used for the amount of compostable material transferred from IoT smart composter 106 into a central composting facility.

Figure 2:
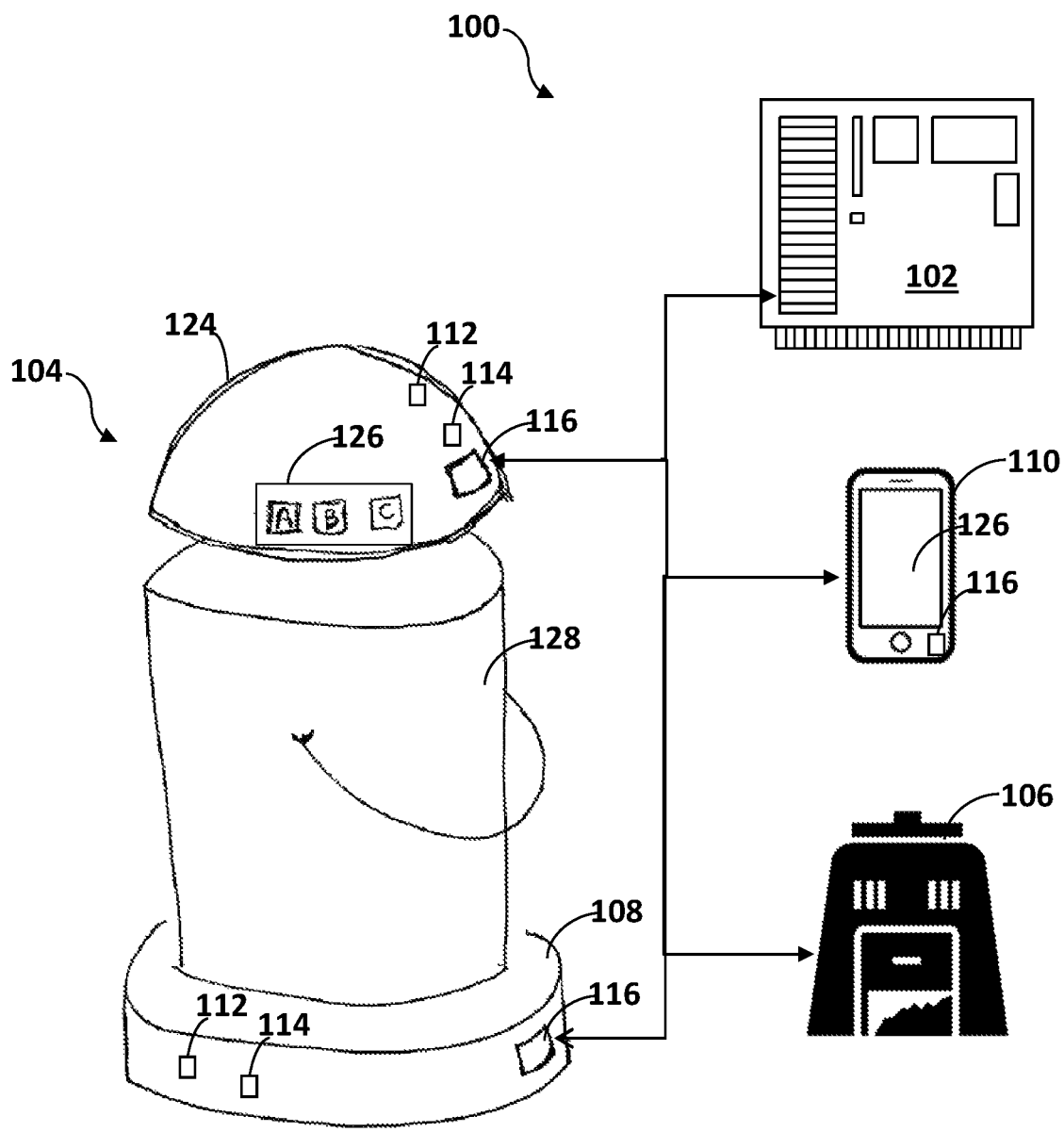
FIG. 2 schematically illustrates a smart IoT compost bin for measuring and logging the collection of compostable material, in accordance with some embodiments of the invention.

Reference is made to FIG. 2, which schematically illustrates a smart IoT compost bin 104, in accordance with some embodiments of the invention.

IoT compost bin 104 may include a chamber or container 128 for collecting compostable material (e.g., food scraps or plant waste), a lid 124 for opening and closing the container, and one or more sensor(s), such as a scale 108, for measuring and logging an amount of the compostable material contained in IoT compost bin 104 and/or other compost properties. Typically IoT compost bin 104 is deployed indoors (e.g., in a kitchen, such as, by a sink or trash can), but may be located in any area. IoT compost bin 104 may include one or more processor(s) 112, one or more memorie(s) 114, and one or more wireless module(s) 116. In various embodiments, any combination of parts 124, 128, and/or 108 of IoT compost bin 104 may be smart (e.g., include components 112, 114, and/or 116) or conventional (e.g., not electronically operable). Components 112, 114, and/or 116, may be embedded in, permanently attached to (e.g., such that removal causes malfunction), detachably connected to, or otherwise operably connected to, one or more smart parts 124, 128, and/or 108 of IoT compost bin 104.

In one example shown in FIG. 2, IoT compost bin 104 has two "smart" parts—lid 124 and scale 108 (e.g., comprising electronic components 112, 114, and/or 116), and a conventional (non-electronic) container 128. A container 128 that is conventional (non-electronic) may allow it to be more easily cleaned than the smart (electronic) parts. In various embodiments, some or all of parts 124, 128, and/or 108 may be water-proof or water-resistant. In one embodiment, the smart lid 124 and scale 108 may operate as network peers, e.g., each independently connected to, and configured to communicate over, IoT network 100. In another embodiment, the smart lid 124 and scale 108 may operate using a master-slave protocol, whereby one of the parts 124 or 128 (but not the other) communicates over IoT network 100 (e.g., cellular or Wi-Fi enabled) and the other part 128 or 124, communicates locally with the one part 124 or 128, respectively, but not the IoT network 100. In one example, the smart lid 124 may operate as the master device and the smart scale 108 may operate as the slave device. In this example, scale 108 may report weight measurements to smart lid 124, which may process, store, and transfer the weight data over IoT network 100. Smart lid 124 may add a unique identifier associated with IoT compost bin 104 and/or other sensed or collected data (e.g., compost type, compost agitation pattern, compost material properties, environmental conditions, location, etc.). A user interface 126 may be embedded in, or attached to, IoT compost bin 104 (e.g., on smart lid 124 and/or scale 108), or may be provided in an application on personal user device 110, to receive user entered data (e.g., compost type) or user-verification of autonomously sensed data.

IoT compost bin 104 may communicate its data, via two-way communication, over IoT network 100, with monitoring device 102, personal user device 110 and/or IoT composter 106. IoT compost bin 104 may communicate directly with monitoring device 102, or indirectly via personal user device 110 and/or IoT composter 106 as an intermediary. When communicating indirectly, personal user device 110 and/or IoT composter 106 may add data to, or verify data from, IoT compost bin 104, and relay the modified and/or verified data to monitoring device 102. Monitoring device 102 may then receive and analyze the resulting data and post results to a public forum.

Figure 3:
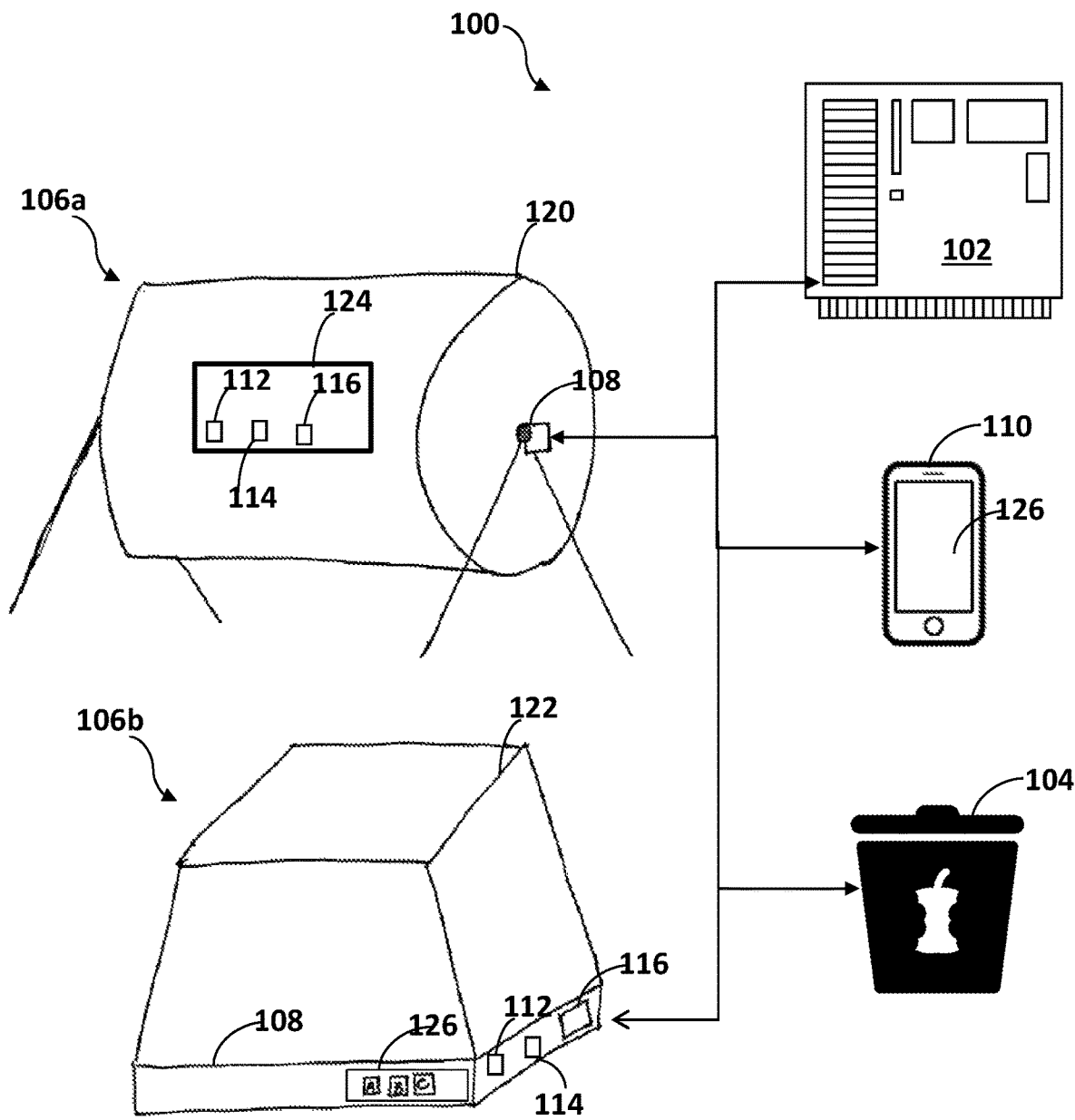
FIG. 3 schematically illustrates a smart IoT composter for measuring and logging the composting of material, in accordance with some embodiments of the invention.

Reference is made to FIG. 3, which schematically illustrates a smart IoT composter 106, in accordance with some embodiments of the invention. IoT composter 106 may include one or more container(s) 120 for composting material e.g., emptied from IoT compost bins 104. Typically IoT composter 106 is deployed outdoors (e.g., in a backyard or garden, or at designated street corners when owned by a community, municipality or government), but may be located in any area. IoT composter 106 may include one or more lid(s) 124 for opening and closing container(s) 120, and one or more sensor(s), such as a scale 108, for measuring and logging an amount of the compostable material contained in IoT composter 106 and/or other compost properties. IoT composter 106 may include one or more user interface(s) 126 to receive data (e.g., compost type) entered by a user. IoT composter 106 may include one or more processor(s) 112, one or more memorie(s) 114, and one or more wireless module(s) 116. In various embodiments, any combination of parts 124, 120, and/or 108 of IoT composter 106 may be smart (e.g., include components 112, 114, and/or 116) or conventional (e.g., not electronically operable). Components 112, 114, and/or 116, may be embedded in, permanently attached to (e.g., such that removal causes malfunction), detachably connected to, or otherwise operably connected to, one or more smart parts 124, 120, and/or 108 of IoT composter 106.

In some embodiments, container 120 may be split into multiple sub-containers. Each sub-container 120 may have a unique sensor and/or unique identifier (all containers may share a communication module 116), giving each container 120 an independent composting status.

In one example shown in the top illustration of FIG. 3, IoT composter 106a has two "smart" parts—lid 124 and scale 108 (e.g., comprising electronic components 112, 114, and/or 116), and a conventional (non-electronic) drum or barrel-shaped container 120. Composter parts 124 and/or 108 may operate, for example, as described in reference to FIG. 2. For example, the smart lid 124 and scale 108 may operate as peer devices, or as master and slave devices, in IoT network 100.

In another example shown in the bottom illustration of FIG. 3, IoT composter 106b has a single "smart" part—scale 108 (e.g., comprising electronic components 112, 114, and/or 116), and a conventional (non-electronic) container 122 (with a lid or other cavity). Scale 108 may transmit data directly to monitoring device 102, IoT compost bin 104 and/or personal user device 110.

IoT composter 106 may transmit IoT composter's 106 unique identifier, an amount of the compostable material contained in IoT composter 106 and/or other sensed or collected data (e.g., compost type, compost agitation pattern, compost material properties, environmental conditions, location, etc.). A user interface 126 may be embedded in, or attached to, IoT composter 106 (e.g., on smart lid 124 and/or scale 108), or may be provided in an application on personal user device 110, to receive user entered data (e.g., compost type) or user-verification of autonomously sensed data.

IoT composter 106 may communicate its data, via two-way communication, over IoT network 100, with monitoring device 102 and/or personal user device 110. IoT composter 106 may also communicate with IoT compost bin 104, e.g., indicating when it is empty and available for a deposit (e.g., indicating an amount and/or preferred compost type for deposit) or an alert when its compost has reached a maturation stage and is due to be emptied. IoT composter 106 may communicate directly with monitoring device 102, or indirectly via personal user device 110 or IoT compost bin 104 as an intermediary. When communicating indirectly, the intermediary device e.g., personal user device 110, may add data to, or verify data from, IoT composter 106, and relay the modified and/or verified data to monitoring device 102. Monitoring device 102 may then receive and analyze the resulting data and post results to a public forum.

Reference is made to FIG. 4, which schematically illustrates a multi-user system for monitoring an IoT network 100 of composting end-devices 104 and/or 106, e.g., suited for a shared group or household of users, in accordance with some embodiments of the invention.

In FIG. 4, a single account for a group or household of users may be registered for a plurality of N IoT compost bins 104 (e.g., $B_1, B_2, \ldots, B_N$), a plurality of M personal user devices 110 (e.g., $S_1, S_2, \ldots, S_M$), and one or more composters 106. Each of the plurality of M personal user devices 110 may be controlled by one individual user (e.g., for a 1-1 or 1-many user-device relationship). In various embodiments, all users may share all of the plurality of N IoT compost bin 104, or various user(s) or subgroup(s) may have exclusive use of different individual IoT compost bins 104. The group or household account may be registered at monitoring device 102.

Reference is made to FIG. 5, which schematically illustrates a multi-account system for monitoring an IoT network 100 of composting end-devices 104 and/or 106, e.g., suited for a shared community of multiple groups or households of users, in accordance with some embodiments of the invention.

In FIG. 5, a community account may be registered for a plurality of P groups or households of devices (e.g., $H_1, H_2, \ldots, H_P$) and a plurality of Q shared community IoT composters 106 (e.g., $C_1, C_2, \ldots, C_Q$). Each ith group or household (e.g., $H_i$) may comprise a plurality of IoT compost bins 104 and/or a plurality of personal user devices 110. Each of the personal user devices 110 may be controlled by, or registered to, one individual user (e.g., for a 1-1 or 1-many user-device relationship), each of the IoT compost bins 104 may be used by a member of its group or household $H_i$, and all of the plurality of Q shared IoT community composters 106 may be used by all of the members of the community, or various user(s), subgroup(s) or household(s), may have exclusive use of different individual IoT composters 106. The community may be, for example, a rural, urban or suburban community, for example, for one or more garden(s), schools, etc. In an example urban setting, the shared IoT community composters 106 may be dispersed, operated, and emptied by a municipal collection service or another government agency. In some embodiments, monitoring device 102 may generate a map of optimal locations to distribute the plurality of shared IoT community composters 106 that best fits measured or predicted composting needs associated with the number of users or plurality of IoT compost bins 104 in the plurality of P groups or households. Maps may be generated by an optimization algorithm (e.g., minimizing distances between compost bins 104 and composters 106, and/or maximizing distances between different composters 106 from each other) or a deep learning model trained to minimize distances between devices based on historical data of actual deposit patterns. The community account may be registered at monitoring device 102.

Monitoring device 102, IoT compost bin 104, IoT composter 106, and personal user device 110 of FIGS. 4 and 5 may operate as described in reference to FIGS. 1-3. Any combination and proportions of these devices, users and accounts, may be used, such as one-to-one, one-to-many, or many-to-one proportions.

Figure 6:
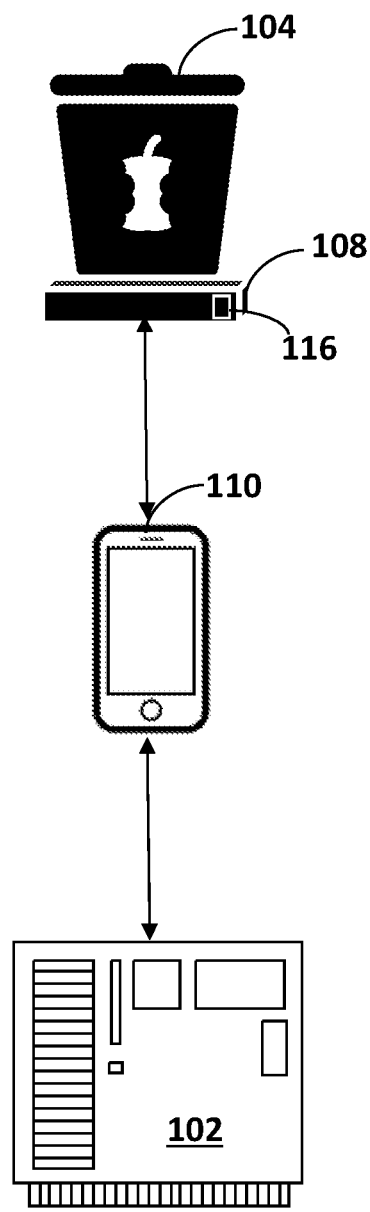
FIG. 6 schematically illustrates an example use-case of the system of FIG. 1 for monitoring a single IoT composting end-device, in accordance with some embodiments of the invention.

Reference is made to FIG. 6, which schematically illustrates an example use-case of the system of FIG. 1 for monitoring a single IoT composting end-device 104 or 106, in accordance with some embodiments of the invention. Although FIG. 6 shows a compost bin 104, a composter 106 may also be used.

In FIG. 6, a smart scale 108 is provided for placing any one or more conventional (non-electronic) IoT composting end-device 104 (or 106). Scale 108 may comprise one or more processor(s) 112 to measure an amount (e.g., weight) of compostable material contained in IoT composting end-device (e.g., the scale tared to exclude the weight of the bin itself), memorie(s) 114 to store the amount, and wireless module(s) 116 to wirelessly transmit the stored amount to a personal user device 110. Scale 108 may wirelessly transmit the data to personal user device 110 using any of the networks or protocols disclosed in reference to FIG. 1, such as, Bluetooth. Personal user device 110 may operate an application to indicate which of one or multiple IoT composting end-devices are being weighed. Personal user device 110 may associate the corresponding unique identifier to the data. Personal user device 110 may also add additional data, such as, the compost type, manually entered into the application by a user. Personal user device 110 may transmit to monitoring device 102 the amount data, unique identifier, additional data (e.g., compost type, environmental conditions, location, etc.). Monitoring device 102 may analyze the data and post usage information of the single IoT composting end-device 104 or 106 to a public forum. Monitoring device 102 may also post the aggregate amount from more than one end user devices 104 as the amount of starting collected household composting material and separately post the amount of composted material of any number of outdoor devices 106. In some embodiments, monitoring device 102 may separate the data posted from devices 104 or 106 segmented based on device location or affiliation with rural, suburban and urban environments, or sub-communities thereof. Different sub-communities in urban environments include a community garden where the composting process is completed and the composted material is used locally, and municipal infrastructure where composted material from devices 106 is transferred to a centralized municipal-run composting facility where the final composting process takes place. In some embodiments, e.g. in an urban setting, a live map of devices 104 or 106 and their real-time statuses are provided to a public forum, a compost collection company, or the municipality which can adjust their collection route and timing based on the data provided by the IoT devices 104 or 106. Monitoring device 102 may also provide rewards or incentives to users proportional to the amount of compostable material associated with their registered device (s), proportional to other composting metrics, such as metrics of sustainability or compost quality, computed based on the amount. For example, monitoring device 102 may post quantities of methane and/or $CO_2$ reduced by a user, group, household, or community's composting, thereby quantifying the impact of collective composting efforts to encourage the practice.

Figure 7:
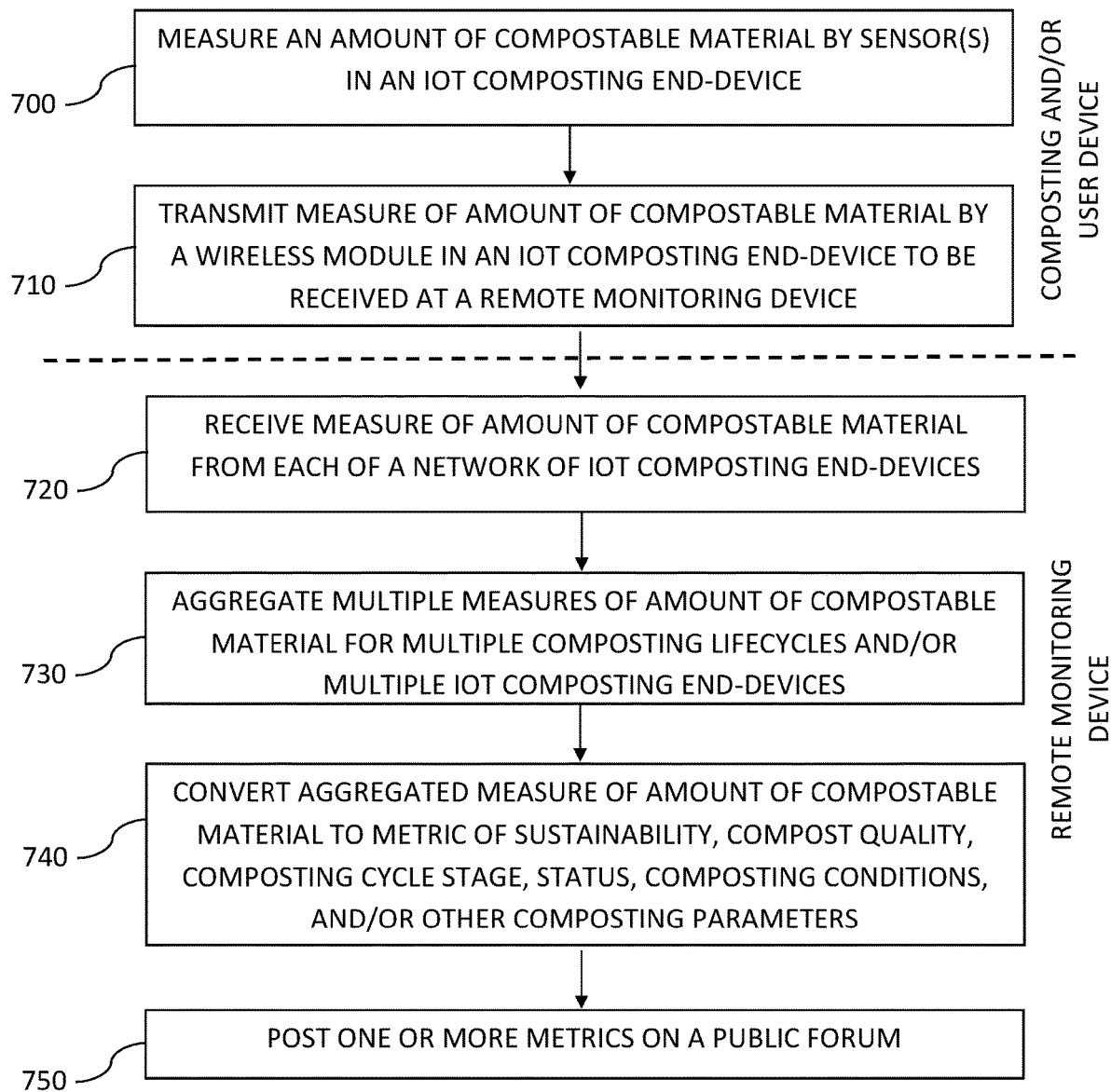
FIG. 7 is a flowchart of a method for remotely monitoring an IoT network of composting end-devices, in accordance with some embodiments of the invention.

Reference is made to FIG. 7, which is a flowchart of a method for remotely monitoring an IoT network of composting end-devices, in accordance with some embodiments of the invention. The IoT composting end-devices may include one or more IoT compost bins (e.g., for collecting compostable material) and/or IoT composters (e.g., for composting compostable material). Monitoring device, IoT compost bin, IoT composter, scale and personal user device described in reference to FIG. 7 may include devices 102, 104, 106, 108, and 110, respectively, described in reference to FIGS. 1-6, or other or additional devices may be used. Operations described in reference to FIG. 7 may be executed using one or more processor(s) (e.g., 112 of FIGS. 1-3) in the respective devices.

In operation 700, an IoT composting end-device (e.g., IoT compost bin 104 or IoT composter 106 of FIGS. 1-6) may detect using one or more sensors (e.g., scale(s) 108 of FIGS. 1-3 and 6, imager(s), distance sensor(s), and/or position sensor(s)) data representing an amount of compostable material contained in a container that is integral or attached to the IoT composting end-device (e.g., IoT compost bin container 128 of FIG. 2 or IoT composter container 120 or 122 of FIG. 3). The IoT composting end-device may use one or more processors (e.g., 112 of FIGS. 1-3) to compute a measure of the amount of compostable material based on the data detected by the one or more sensors. Additionally or alternatively, a user may manually enter the measure of the amount of compostable material (e.g., via personal user device 110 of FIGS. 2-6). The sensor data and/or processor computed or manually entered measure of the amount of compostable material may include any individual measure or combination of weight, mass, pressure, density, volume, area, length, and/or position.

In some embodiments, the IoT composting end-devices may use different metrics of the amount of compostable material for each different individual or type of IoT composting end-device to prevent double-counting the amounts. For example, when an amount of material is transferred from an IoT compost bin to an IoT composter, the amount is converted from a first type of metric to a second type of metric. In some embodiments, the IoT composting end-devices (or remote monitoring device(s)) may verify a chain of custody of transferred compostable material by verifying that a net loss in an amount of compostable material emptied from an IoT compost bin substantially matches a net gain in an amount of compostable material added to an IoT composter within a predefined margin of error and within a predefined duration of time. Additionally or alternatively, the IoT composting end-devices (or remote monitoring device(s)) may verify a chain of custody of transferred compostable material by verifying authentication signals communicated between a pair of an emptied IoT compost bin and a filled IoT composter.

In operation 710, the IoT composting end-device and/or personal user device may transmit, via a wireless communication module (e.g., 116 of FIGS. 1-3 and 6), the measure of the amount of compostable material to one or more devices over the wireless communication network (e.g., 100 of FIGS. 1, 4 and 5). The IoT composting end-device and/or personal user device may also transmit, from storage in one or more of its memories (e.g., 114 of FIGS. 1-3), a unique identifier of the IoT composting end-device to which the measure is linked. This may allow the receiving device to identify which measures of amounts are associated with which IoT composting end-device. The measure of the amount of compostable material may be transmitted, directly or indirectly, to one or more IoT network devices including, e.g., a remote monitoring device (e.g., 102 of FIGS. 1-6), a cloud-based service, another IoT composting end-device (e.g., 104 or 106 of FIGS. 1-6), another IoT connected component (e.g., smart lid 124 or scale 108 of FIGS. 2-3) of the same IoT composting end-device, and/or a personal user device (e.g., 110 of FIGS. 2-6).

The wireless communication module (e.g., 116 of FIGS. 1-3 and 6) may be a complete wireless communication circuit including an antenna for communicating over a wireless communication network (e.g., 100 of FIGS. 1, 4 and 5). The wireless communication module may be embedded in, or operably connected to, an IoT connected smart lid (e.g., 124 of FIGS. 2-3) for sealing the container, an IoT connected smart container for holding the compostable material, an IoT connected sensor device comprising the one or more sensors (e.g., smart scale 108 of FIGS. 2-3), and/or a personal user device (e.g., 110 of FIGS. 2-6). In one embodiment, e.g., shown in FIG. 2 and the top illustration of FIG. 3, IoT composting end-device has two distinct "smart" parts—an IoT connected smart lid (e.g., 124) and an IoT connected sensor device (e.g., smart scale 108), both of which have an embedded wireless communication module to communicate with each other and/or another IoT network device over a short-range or long-range wireless communication network. In another embodiment, e.g., shown in the bottom illustration of FIG. 3, IoT composting end-device has one distinct "smart" part—an IoT connected sensor device (e.g., smart scale 108) with an embedded wireless communication module to communicate with another IoT network device over a short-range or long-range wireless communication network.

The IoT composting end-devices are configured to compute and/or transmit (and one or more remote monitoring devices are configured to receive) the measure of the amount of compostable material periodically, upon remote request, in response to satisfying a threshold condition or detecting a predetermined event, or initiated by an end user (e.g., via a user interface 126). The predetermined event may be one or more of a material deposit that partially fills the IoT composting end-device, a complete fill of the IoT composting end-device, a complete emptying of the IoT composting end-device, and a material transfer between two IoT composting end-devices.

In operation 720, one or more remote monitoring devices (e.g., 102 of FIGS. 1-6) may receive, from each of a plurality of the IoT composting end-devices and/or a personal user device, the transmitted measure of the amount of compostable material and an associated unique identifier of the transmitting IoT composting end-device. The one or more remote monitoring devices and/or a personal user device may contain one or more (e.g., wired or wireless) communication circuits (e.g., 116 of FIG. 1) to communicate with the network of IoT composting end-devices via their respective embedded wireless modules (e.g., 116 of FIG. 1).

In operation 730, the one or more remote monitoring devices may aggregate a plurality of measures of the amount of compostable material detected over one or more composting lifecycles and/or associated with one or more of the IoT composting end-devices to quantify an aggregate amount of compostable material.

The aggregated plurality of measures of the amount of compostable material may be associated with any individual or combination of a single IoT compost bin, a single IoT composter, a plurality of IoT compost bins associated with a single or a plurality of IoT composters, or a plurality of IoT composters associated with a single or a plurality of IoT compost bins, or a single or plurality of users or entities associated with one or more IoT compost bins and/or IoT composters.

In operation 740, the one or more remote monitoring devices may convert the aggregated measure of the amount of compostable material to a metric of sustainability predicted or measured to be caused by composting the aggregate amount of compostable material, a metric of quality of the compostable material based on proportions of the aggregate amount associated with each of a plurality of different types of the compostable material, an indication of composting cycle, an indication of composting status, an indication of composting conditions, and/or other composting parameters. Additionally or alternatively, one or more of these metrics may be computed by any other device in the network.

The metric of sustainability may include, for example, one or more individual or combined metrics of Carbon dioxide ($CO_2$) reduction, Methane ($CH_4$) reduction, Nitrous oxide ($N_2O$) reduction, Hydrofluorocarbons (HFCs) reduction, Perfluorocarbons (PFCs) reduction, Sulphur hexafluoride ($SF_6$) reduction, global warming potential (GWP), and a carbon footprint measurement. In some embodiments, the metric of sustainability predicted at a current time is based on an experimentally observed metric of sustainability measured for composting material in the past.

The metric of quality may be determined based on one or more types of compostable material determined automatically by sensors in the IoT composting end-devices and/or manually by user entry into a user interface (e.g., 126 of FIGS. 2-3). Types may include, for example, green waste, protein waste, and brown waste, or other categories. The user interface may be integrated into the IoT composting end-device (e.g., smart lid 124 and/or smart scale 108 of FIGS. 2-3) or provided by an application operated on a portable wireless communication device (e.g., 110 of FIGS. 2-6). The manual user entry may be associated with the amount measured by the IoT composting end-device at substantially the same time or during the same session. In one embodiment, the type and associated amount of compostable material may be independently determined for each of a plurality of deposits of compostable material each used to partially fill the IoT composting end-device. Additionally or alternatively, the type and associated amount of compostable material may be determined once for the entire IoT composting end-device each time the device is filled.

The stage of the composting cycle may be, for example, mesophilic, thermophilic, and/or maturation phases. The stage of the composting cycle may be determined based on the measure of composting conditions (e.g., temperature, an amount or type of enzymes, time, and/or color of composting content).

The composting status may be determined for each IoT composting end-device as, for example, a compost pending status for content contained in the IoT compost bin, a compost in-progress status for content contained in the IoT composter at a composing lifecycle stage prior to maturation, or a compost complete status for content contained in or emptied from the IoT composter at or after a composing lifecycle stage of maturation. Other stages or sub-stages may also be used.

In operation 750, the one or more remote monitoring devices may post on a public or private forum one or more of the metrics, or derivatives thereof, of sustainability, compost quality, composting cycle, composting status, composting conditions, and/or other composting parameters. The post(s) may be viewed by users on one or more user interfaces (e.g., 126) on personal user devices and/or IoT composting end-device.

The one or more remote monitoring devices may generate and post one or more interactive map(s) of IoT composting end-device. One such map may show optimal locations for a plurality of IoT composters that best fits predicted or measured composting needs of a plurality of nearby IoT compost bins. A same or different map may visualize IoT composters at various locations with deficient amounts of each type of compostable material, wherein the deficient amounts may indicate deficits of each type from an optimal combination predicted to result in optimal compost quality.

In some embodiments, the IoT composting end-devices may be remotely controllable by the remote monitoring device(s). In one example, the remote monitoring device(s) may remotely activate an alert on a user interface of the IoT composting end-device indicating that the IoT composting end-device should be emptied or filled. Additionally or alternatively, the remote monitoring device(s) may remotely activate a motor in the IoT composter to remotely agitate the IoT composter or transfer compost between containers upon reaching a particular stage of the composting cycle.

Other operations or orders of operations may be performed. Operations performed by specific devices may also be performed by any different device in the system, or other devices not in the system. By way of example, in some embodiments, IoT device 104 may communicate with IoT device 106 which then communicates with remote monitoring device 102 directly and/or via user device 110. In other embodiments, IoT device 104 and IoT device 106 may each independently communicate with remote monitoring device 102 directly and/or via user device 110. Additionally or alternatively, in embodiments where compost data is entered manually, operation 700 may be omitted and the composting devices may be standard (non-IOT) composting devices.

Figure 9:
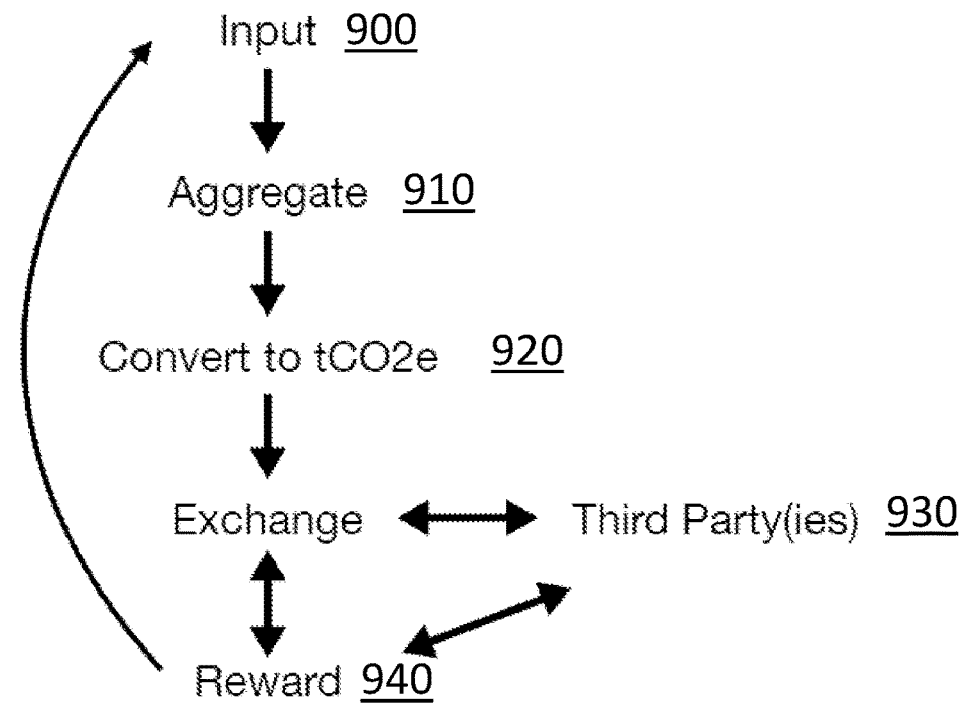
FIGS. 9 and 10 are flowcharts of methods for trading carbon credits to reduce or eliminate carbon emissions, in accordance with some embodiments of the invention.
Figure 10:
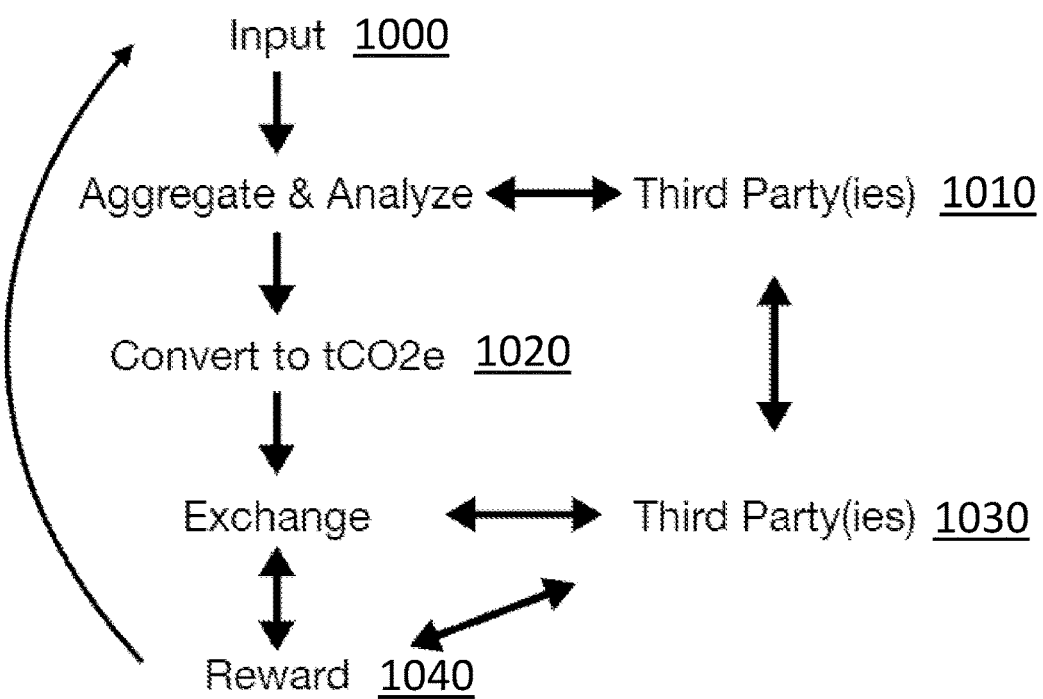

Reference is made to FIGS. 9 and 10, which are flowcharts of methods for trading carbon credits to reduce or eliminate greenhouse gases, in accordance with some embodiments of the invention. Monitoring device, IoT compost bin, IoT composter, scale and personal user device described in reference to FIGS. 9 and 10 may include devices 102, 104, 106, 108, and 110, respectively, described in reference to FIGS. 1-6, or other or additional devices may be used. Operations described in reference to FIGS. 9 and 10 may be executed using one or more processor(s) (e.g., 112 of FIGS. 1-3) in the respective devices.

In operations 900 and 1000, a host (e.g., monitoring device 102 of FIGS. 1-6 or another system device or server)

may receive input, via a wireless communication module (e.g., 116 of FIGS. 1-3 and 6), from an IoT composting end-device (e.g., 104 or 106 of FIGS. 1-6) and/or personal user device (e.g., 110 of FIGS. 1-6) via wireless modules embedded therein (e.g., 116 of FIG. 1). The host may register each of the plurality of IoT composting end-devices and/or personal user devices to a plurality of respective composting users (e.g., in one-to-one, one-to-many and/or many-to-one user to device correspondence). The input may be a measure of the amount of compostable material (e.g., a weight or volume of household organic material diverted from a trash bin for composting). The input may include a unique identifier of the composting user registered to the IoT composting end-device and/or personal user device to identify the input source. The input may be entered manually by a user via a web interface or mobile app interface on the personal user device, or entered automatically from a scale (e.g., 108 of FIGS. 1-3 and 6), directly or indirectly (e.g., via the mobile app), into the host's storage (e.g., a database in monitoring device memory unit 112 of FIG. 1).

In operations 910 and 1010, the host may aggregate a plurality of measures of the amount of compostable material detected over one or more composting lifecycles and/or associated with one or more of the composting devices to quantify an aggregate amount of compostable material. Amounts may be aggregated that are associated with each unique identifier to quantify an aggregate amount of material composted by each composting user. Additionally or alternatively, amounts may be aggregated that are associated with multiple unique identifiers composted by a group or segment of multiple composting users (or all users). For example, the aggregate may be a sigma (sum) over all relevant inputs (e.g., as a measure of weight, volume, etc.) and/or over a desired time period.

Additionally or alternatively in FIG. 10, in operation 1010, the host or a third party may perform big data analysis on the input data using artificial intelligence systems, such as neural networks or support vector machines (SVM), to predict or optimize composting data. The analyzed input parameters may include, e.g., geographical region (e.g., state, county, zip code, or more granular location such as GPS location), type of household (e.g., urban, urban village, suburban, rural, etc.), and various other parameters. The analysis results may predict or optimize composting data, such as, optimizing pickup routes and/or schedules for a fleet of vehicles, optimizing locations of where to place community composters to maximize their even distribution based on historical trends of compost production, etc. The analysis results may be shared with third parties such as governments or municipalities for improving their household organic waste collection, companies that sell composters, and other third parties. For example, such companies may be interested in using this data for marketing purposes, such as, to offer rewards or merchandise to specific demographics.

In operations 920 and 1020, the host may compute a measure of net negative carbon emissions reducing greenhouse gasses in the Earth's atmosphere due to composting the aggregated amount of material composted by one or more of the composting users from operations 910 and 1010. The measure of net negative carbon emissions may be a standardized metric of carbon emissions or environmental impact, such as, $CO_2$ Equivalent ($CO_2$ E). For example, each kg of compost may be equivalent to +15 kg $CO_2$ E. Operations 920 and 1020 thus generate a repository of standardized measures of net negative carbon emissions (e.g., $CO_2$ E) saved by not converting household organic material to methane due to composting.

In operations 930 and 1030, the host or a third party may provide an exchange or marketplace for trading carbon credits, for example, representing portions of the measure of net negative carbon emissions in the Earth's atmosphere based on amounts of $CO_2$ E saved by composting. In this exchange, carbon-positive third parties may acquire carbon credits to reduce or eliminate a measure of net positive carbon emissions in the Earth's atmosphere produced by the third parties. For example, a carbon-positive third party may acquire a number of carbon credits representing a measure of net negative carbon emissions that is equal and opposite to a net positive carbon emissions produced by one or more carbon-positive users to render the third party's operations carbon-neutral. Carbon-positive third parties may trade or purchase carbon credits from the carbon-negative composters, directly or indirectly via the host, using rewards, such as, benefits to the third-parties' platforms, monetary compensation, composting equipment, donations for ecological services such as planting trees, etc. In this way, third parties may commission or incentivize users who otherwise would not have the finances, supplies, or desire to compost, to increase global compost production and reduce greenhouse gasses in the Earth's atmosphere.

The host may issue carbon credits to the carbon-positive third parties and rewards to the composting users. Rewards may be issued to each composting user in amounts proportional to the amount of compost they produce (e.g., their aggregated amount of composted material) or in amounts proportional to their compost contributing to the carbon credits purchased or traded on the exchange. The carbon credits and/or rewards may be embedded in a digital medium. The digital media containing the carbon credits and/or rewards may be distributed to carbon-positive third parties and/or composting users securely, for example, using a secure communication channel with the host, in a peer-to-peer blockchain network, using proxy re-encryption, or another security scheme that encrypts or obfuscates the third parties' identifying digital information and/or carbon credit information. Additionally or alternatively, the carbon credits and/or rewards may be anonymized by issuing the digital media without the unique identifiers associated with the composting users corresponding to the carbon credits and/or identifiers of the third parties issuing the rewards.

Additionally or alternatively, in FIG. 10, the party performing data analytics in operation 1010 (e.g., composter manufacturers) may connect with the exchange host in operation 1030. In one embodiment, this may allow data analytics parties to communicate, directly or indirectly (e.g., via the exchange host), with the platform users.

In operations 940 and 1040, the host may issue rewards to composters commensurate, e.g., proportional to, the amount of their traded compost. In one embodiment, the rewards given to the composter is equal to the value of their traded compost. In another embodiment, the rewards may be correlated with, but not equal to, their traded compost. For example, a third party may pay the exchange host for the carbon credits and separately issue rewards to the composter, thus paying not only for carbon credits but also for additional user data, such as, target demographics information. In some embodiments, the host may embed the exchanged rewards inside digital media and distribute the digital media to the composter. The digital media containing the rewards may be distributed to composters securely, for example, using a secure communication channel with the host, in a peer-to-peer blockchain network, using proxy re-encryption, or another security scheme that anonymizes or encrypts the user's or source's identifying digital information and/or rewards information.

After operations 940 and 1040, the process may repeat for each new input event or input period to restart the process at operations 900 and 1000.

Other operations or orders of operations may be performed.

In various embodiments, carbon credits may represent an amount of compostable material is currently or has already been composted in the past, or may represent a commitment to compost that amount of material in the future. When the material has already been processed, the environmental impact has already been effected; whereas when the carbon credits represent a commitment to composted in the future, the exchange of carbon credits and rewards commissions composting that would not have otherwise been performed, and so effects an additional environmental impact.

"Smart" or "intelligent" devices may refer to devices comprising electronic components (e.g., one or more processor(s) 112, one or more memorie(s) 114, and one or more wireless module(s) 116). "Smart" or "intelligent" devices may be IoT or wirelessly connected devices comprising one or more sensor(s) for monitoring conditions and a wireless communication module for communicating the sensor data over the IoT or wireless network. In other embodiments these devices may be hard-wired (not wireless), or a combination of wired and wireless.

In the foregoing description, various aspects of the present invention are described. For purposes of explanation, specific configurations and details are set forth in order to provide a thorough understanding of the present invention. However, it will also be apparent to persons of ordinary skill in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The aforementioned flowchart illustrate the architecture, functionality, and operation of possible implementations of systems and methods according to various embodiments of the present invention. In this regard, each block in the flowchart may represent a segment, or portion of code, which may comprise one or more executable instructions for implementing the specified logical function(s). In some alternative implementations, the functions noted in the block may occur out of the order noted in the figures or by different modules. Unless explicitly stated, the method embodiments described herein are not constrained to a particular order or sequence. Additionally, some of the described method embodiments or elements thereof can occur or be performed at the same point in time. Each block of the flowchart, and combinations of blocks in the flowchart, can be implemented by special purpose hardware-based systems that perform the specified functions or acts, or combinations of special purpose hardware and computer instructions.

Embodiments of the invention may include an article such as a non-transitory computer or processor readable medium, or a computer or processor non-transitory storage medium, such as for example a memory (e.g., one or more memories 114 of FIGS. 1-3), a disk drive, or a USB flash memory, encoding, including or storing instructions, e.g., computer-executable instructions, which, when executed by a processor or controller (e.g., one or more processor(s) 112 of FIGS. 1-3), carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

Devices or components ending in a parenthetical plurality "(s)" may indicate that the plurality is optional and so, cover both the option of a single such device or component or a plurality of (multiple) such devices or components.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

The invention claimed is:

1. One or more remote devices for monitoring a network of IoT composting end-devices, the one or more remote devices comprising:
   one or more communication circuits configured to communicate with the network of IoT composting end-devices via wireless modules embedded therein; and
   one or more processors configured to:
      receive, from each of the IoT composting end-devices, a measure of an amount of compostable material detected by one or more sensors in the IoT composting end-device and an associated unique identifier of the IoT composting end-device,
      aggregate a plurality of measures of the amount of compostable material detected over one or more composting lifecycles associated with one or more of the IoT composting end-devices to quantify an aggregate amount of compostable material, wherein the one or more processors are configured to generate a live map of the network of IoT composting end-devices indicating real-time statuses based on the aggregate amount of compostable material associated with the one or more of the IoT composting end-devices at various locations to adjust user routes for compost collection or deposit;

compute a measure of net negative carbon emissions reducing greenhouse gasses in the Earth's atmosphere equivalent to a proportion of the aggregate amount of compostable material;

host an exchange to trade carbon credits representing portions of the measure of net negative carbon emissions to reduce or eliminate a measure of net positive carbon emissions in the Earth's atmosphere;

securely issue a digital medium containing the traded carbon credits;

receive, from each of one or more of the IoT composting end-devices, multiple sensed conditions of compostable material detected by one or more sensors in the IoT composting end-device;

based on a combination of the multiple sensed compost conditions in the IoT composting end-device, determine a stage of a composting cycle of the compostable material; and upon determining a particular stage of the composting cycle is reached, send one or more control commands over the network to control the IoT composting end-device to remotely activate a motor in the IoT composting end-device to remotely agitate the IoT composting end-device or transfer compost between different containers.

2. The one or more remote devices of claim 1, wherein the one or more processors are further configured to post on a public forum the aggregate amount of compostable material detected over the one or more composting lifecycles associated with at least one of the one or more of the IoT composting end-devices.

3. The one or more remote devices of claim 1, wherein the one or more processors are further configured to convert the aggregate amount of compostable material to a metric of sustainability predicted or measured to be caused by composting the aggregate amount of compostable material.

4. The one or more remote devices of claim 3, further configured to post on a public forum the metric of sustainability associated with the one or more IoT composting end-devices.

5. The one or more remote devices according to claim 1, wherein the one or more processors are further configured to:

record one or more types associated with each of the aggregated plurality of measures of the amount of compostable material associated with the one or more IoT composting end-devices, compute a metric of quality of the compostable material based on proportions of the aggregate amount associated with each of a plurality of different types of the compostable material, and post on a public forum the metric of quality associated with the one or more IoT composting end-devices.

6. The one or more remote devices of claim 5, wherein the plurality of different types of compostable material are selected from the group consisting of green waste, protein waste, and brown waste.

7. The one or more remote devices of claim 1, wherein the one or more processors are further configured to:

securely issue an encryption of the digital medium containing the traded carbon credits to a user in a peer-to-peer blockchain network;

securely issue user-specific proxy re-encryption keys unique to each user in the peer-to-peer blockchain network; and transfer the encryption of a digital medium containing the traded carbon credits from one user to another user in the peer-to-peer blockchain network using proxy re-encryption, by simultaneously swapping the one user's proxy re-encryption key with the another user's proxy re-encryption key, without exposing or decrypting the underlying traded carbon credits and/or associated user information.

8. One or more host devices comprising:

one or more communication circuits configured to communicate with a plurality of IoT composting end-devices or personal user devices, via wireless modules embedded therein, wherein the plurality of IoT composting end-devices or personal user devices are registered to a plurality of respective composting users; and one or more processors configured to:

receive via the one or more communication circuits, from each of the plurality of IoT composting end-devices or personal user devices, a measure of an amount of compostable material and a unique identifier of the composting user registered to the IoT composting end-device or personal user device, aggregate a plurality of the measures of amounts of compostable material composted over one or more composting lifecycles associated with the unique identifier to quantify an aggregate amount of material composted by each composting user, compute a measure of net negative carbon emissions reducing greenhouse gasses in the Earth's atmosphere equivalent to a proportion of the aggregate amount of compostable material composted by one or more of the composting users, host an exchange to trade carbon credits representing portions of the measure of net negative carbon emissions to reduce or eliminate a measure of net positive carbon emissions in the Earth's atmosphere produced by one or more carbon-positive users, securely issue an encryption of a digital medium containing the traded carbon credits to the one or more carbon-positive users in a peer-to-peer blockchain network, securely issue user-specific proxy re-encryption keys unique to each user in the peer-to-peer blockchain network, transfer the encryption of the digital medium containing the traded carbon credits from one user to another user in the peer-to-peer blockchain network using proxy re-encryption, by simultaneously swapping the one user's proxy re-encryption key with the another user's proxy re-encryption key, without exposing or decrypting the underlying traded carbon credits and/or associated user information, receive, from each of one or more of the plurality of IoT composting end-devices or personal user devices registered to the plurality of respective composting users of the plurality of IoT composting end-devices, multiple sensed conditions of compostable material detected by one or more sensors in the IoT composting end-device, based on a combination of the multiple sensed compost conditions in the IoT composting end-device, determine a stage of a composting cycle of the compostable material, and upon determining a particular stage of the composting cycle is reached, send one or more control commands over a network to control the IoT composting end-device to remotely activate a motor in the IoT composting end-device to remotely agitate the IoT composting end-device or transfer compost between different containers.

9. The one or more host devices of claim 8, wherein the one or more processors securely issue the digital medium by establishing a secure communication channel with each of the one or more carbon positive users.

10. The one or more host devices of claim 8, wherein the one or more processors securely issue the digital medium using a blockchain.

11. The one or more host devices of claim 8, wherein the one or more processors are configured to anonymize the carbon credits by issuing the digital media without the unique identifiers associated with the composting users corresponding to the carbon credits.

12. The one or more host devices of claim 8, wherein the one or more processors are configured to trade carbon credits representing a measure of net negative carbon emissions equal and opposite to the net positive carbon emissions produced by the one or more carbon-positive users to render its operations carbon-neutral.

13. The one or more host devices of claim 8, wherein the one or more processors are configured to securely issue a digital medium containing rewards to the composting users in amounts proportional to their respective aggregated amount of composted material or the traded proportions thereof.

14. The one or more host devices of claim 8, wherein the one or more processors are configured to generate a live map of a network of the IoT composting end-devices indicating real-time statuses based on the aggregate amount of compostable material composted by the respective composting users associated with respective ones of the network of IoT composting end-devices at various locations to adjust user routes for compost collection or deposit.

15. A method comprising:
 receiving, at a host device via one or more communication circuits, from each of a plurality of IoT composting end-devices or personal user devices, a measure of an amount of compostable material and a unique identifier of a composting user registered to the IoT composting end-device or personal user device;
 aggregating a plurality of measures of the amount of compostable material composted over one or more composting lifecycles associated with the unique identifier to quantify an aggregate amount of material composted by each composting user;
 generating a live map of a network of the plurality of IoT composting end-devices indicating real-time statuses based on the aggregate amount of compostable material composted by the respective composting users associated with respective ones of the network of the plurality of IoT composting end-devices at various locations to adjust user routes for compost collection or deposit;
 computing a measure of net negative carbon emissions reducing greenhouse gasses in the Earth's atmosphere equivalent to a proportion of the aggregate amount of compostable material composted by one or more of the composting users;
 hosting an exchange to trade carbon credits representing portions of the measure of net negative carbon emissions to reduce or eliminate a measure of net positive carbon emissions in the Earth's atmosphere produced by one or more carbon-positive users;
 securely issuing a digital medium containing the traded carbon credits to the one or more carbon-positive users;
 receiving, from each of one or more of the plurality of IoT composting end-devices or personal user devices registered to the plurality of respective composting users of the plurality of IoT composting end-devices, multiple sensed conditions of compostable material detected by one or more sensors in the IoT composting end-device;
 based on a combination of the multiple sensed compost conditions in the IoT composting end-device, determining a stage of a composting cycle of the compostable material; and
 upon determining a particular stage of the composting cycle is reached, sending one or more control commands over a network to control the IoT composting end-device to remotely activate a motor in the IoT composting end-device to remotely agitate the IoT composting end-device or transfer compost between different containers.

16. The method of claim 15, wherein comprising securely issuing an encryption of the digital medium and issuing proxy re-encryption keys unique to each user.

17. The method of claim 15, wherein securely issuing the digital medium comprises establishing a secure communication channel with each of the one or more carbon positive users.

18. The method of claim 15, wherein the digital medium is securely issued using a blockchain.

19. The method of claim 15, wherein securely issuing the digital medium comprises issuing an encryption of the digital medium and issuing proxy re-encryption keys unique to each user.

20. The method of claim 15 comprising anonymizing the carbon credits by issuing the digital media without the unique identifiers associated with the composting users corresponding to the carbon credits.

21. The method of claim 15 comprising trading carbon credits representing a measure of net negative carbon emissions equal and opposite to the net positive carbon emissions produced by the one or more carbon-positive users to render its operations carbon-neutral.

22. The method of claim 15 comprising securely issuing a digital medium containing rewards to the composting users in amounts proportional to their respective aggregated amount of composted material or the traded proportions thereof.

* * * * *